US011000142B2

(12) United States Patent
Girard

(10) Patent No.: US 11,000,142 B2
(45) Date of Patent: May 11, 2021

(54) FLEXIBLE FLOOR MAT INCORPORATING LED LIGHTING

(71) Applicant: John Joseph Girard, Lakewood, OH (US)

(72) Inventor: John Joseph Girard, Lakewood, OH (US)

( * ) Notice: Subject to any disclaimer, the term of this patent is extended or adjusted under 35 U.S.C. 154(b) by 144 days.

(21) Appl. No.: 15/732,627

(22) Filed: Dec. 5, 2017

(65) Prior Publication Data

US 2018/0153328 A1 Jun. 7, 2018

Related U.S. Application Data

(63) Continuation-in-part of application No. 29/628,227, filed on Dec. 3, 2017, now Pat. No. Des. 839,635.

(Continued)

(51) Int. Cl.
*A47G 27/02* (2006.01)
*E04F 15/16* (2006.01)
(Continued)

(52) U.S. Cl.
CPC ........... *A47G 27/0212* (2013.01); *B25H 5/00* (2013.01); *E04F 15/02161* (2013.01); *E04F 15/02172* (2013.01); *E04F 15/105* (2013.01); *E04F 15/163* (2013.01); *E04F 15/166* (2013.01); *F21S 4/22* (2016.01); *F21V 33/006* (2013.01); *A47G 27/0231* (2013.01); *A47G 2200/08* (2013.01); *E04F 15/0215* (2013.01); *E04F 2290/026* (2013.01); *F21S 2/00* (2013.01); *F21V 15/015* (2013.01); *F21V 15/04* (2013.01); *F21V 21/005* (2013.01); *F21V 23/005* (2013.01);
(Continued)

(58) Field of Classification Search
CPC ............ A47G 27/0212; A47G 27/0231; A47G 27/0293; A47G 2200/08; F21V 21/025; F21V 21/04; F21V 33/006; E04F 2290/026; F21Y 2115/10
USPC .............. 362/555, 576, 153, 249.02–249.06, 362/249.11, 287
See application file for complete search history.

(56) References Cited

U.S. PATENT DOCUMENTS

| 1,756,380 A | 4/1930 | Osborn ............. A47G 27/0225 15/244.5 |
| 3,434,715 A | 3/1969 | Brantingham et al. ..................... A47G 27/0231 482/79 |

(Continued)

OTHER PUBLICATIONS

Ergomat LED Solutions For Critical Tasks. Feb. 2016, 2-Page Brochure Advertising Floor Mat.

*Primary Examiner* — Laura C Powers
*Assistant Examiner* — Larissa Rowe Emrich
(74) *Attorney, Agent, or Firm* — David A. Burge; Benjamin D. Burge

(57) ABSTRACT

An up-lighting floor mat includes floor matting that defines an upwardly-facing surface and an opposed downwardly-facing surface when supported atop an upwardly-facing support surface, and that is formed from a first flexible material that enables the up-lighting floor mat to be rolled up for transport or storage; and a first elongate up-lighting assembly positioned within a first elongate slot defined through the floor matting to emit light upwardly from the first elongate slot, wherein at least one elongate edge defined by the first up-lighting assembly is bonded to at least one edge of the floor matting that defines the first elongate slot.

13 Claims, 27 Drawing Sheets

Related U.S. Application Data

(60) Provisional application No. 62/497,863, filed on Dec. 6, 2016.

(51) Int. Cl.

| | |
|---|---|
| *F21S 4/22* | (2016.01) |
| *E04F 15/02* | (2006.01) |
| *F21V 33/00* | (2006.01) |
| *E04F 15/10* | (2006.01) |
| *B25H 5/00* | (2006.01) |
| *F21V 15/04* | (2006.01) |
| *F21V 23/00* | (2015.01) |
| *F21Y 115/10* | (2016.01) |
| *F21V 15/015* | (2006.01) |
| *F21S 2/00* | (2016.01) |
| *F21V 21/005* | (2006.01) |
| *F21W 131/30* | (2006.01) |

(52) U.S. Cl.
CPC ...... *F21V 33/0004* (2013.01); *F21W 2131/30* (2013.01); *F21Y 2115/10* (2016.08)

(56) References Cited

U.S. PATENT DOCUMENTS

| | | | |
|---|---|---|---|
| 4,329,739 A | 5/1982 | Loebner | F21S 1/142 362/153 |
| 4,340,929 A * | 7/1982 | Konikoff | E04B 5/46 362/153 |
| 4,544,993 A | 10/1985 | Kirk | 362/153 |
| 4,737,764 A * | 4/1988 | Harrison | E04F 15/02 340/286.13 |
| 4,921,563 A | 5/1990 | Schwertner et al. | B29C 47/06 156/303 |
| 5,095,412 A | 3/1992 | French | 362/153 |
| 5,264,824 A | 11/1993 | Hour | G08B 3/00 340/394 |
| D353,864 S | 12/1994 | Thompson | D21/234 |
| 5,645,914 A | 7/1997 | Horowitz | B32B 3/02 428/81 |
| 5,848,830 A * | 12/1998 | Castle | A47G 27/0243 362/84 |
| 5,863,637 A | 1/1999 | Mansson et al. | 428/156 |
| D420,084 S | 2/2000 | Hooper | D21/792 |
| 6,076,950 A | 6/2000 | Topping et al. | 362/545 |
| D439,102 S | 3/2001 | Pierce | F21V 33/0004 D06/612 |
| 6,204,777 B1 | 3/2001 | Lyons | 340/908 |
| 6,371,637 B1 * | 4/2002 | Atchinson | F21V 19/005 362/249.04 |
| 6,417,778 B2 | 7/2002 | Blum et al. | G08B 5/00 340/815.4 |
| 6,417,919 B1 | 7/2002 | Hewitt et al. | 356/237.1 |
| 6,448,900 B1 | 9/2002 | Chen | 340/815.45 |
| 6,523,986 B1 * | 2/2003 | Hoffmann | E04F 19/02 362/153 |
| 6,531,203 B2 | 3/2003 | Kessler et al. | 428/137 |
| 6,549,502 B1 * | 4/2003 | Lagasse | A47L 23/266 369/63 |
| 6,718,576 B1 | 4/2004 | Shih | A47G 9/06 5/417 |
| 6,740,380 B2 | 5/2004 | Kessler | 428/45 |
| D500,609 S | 6/2005 | Muse | D6/608 |
| D511,920 S | 11/2005 | Bosworth | D06/582 |
| D513,774 S | 1/2006 | Nudo | D21/698 |
| D520,797 S | 5/2006 | Bosworth | B29C 43/206 D06/582 |
| 7,043,792 B2 | 5/2006 | Kessler | 15/215 |
| D525,066 S | 7/2006 | Plenty | D06/608 |
| 7,175,899 B2 | 2/2007 | Kessler | 428/54 |
| 7,233,259 B2 | 6/2007 | Gibson et al. | 310/907 |
| D560,945 S | 2/2008 | Holmes et al. | A47G 27/0231 D06/582 |
| 7,497,040 B2 | 3/2009 | Chambless | 40/586 |
| 7,670,026 B1 | 3/2010 | Hawkins | 362/249.05 |
| D619,405 S | 7/2010 | Vainshtein | A47G 27/0231 D06/613 |
| 8,098,172 B2 | 1/2012 | Graham | 340/908 |
| 8,206,002 B1 * | 6/2012 | Olson | B25H 5/00 280/32.6 |
| 8,376,580 B2 | 2/2013 | Li | 362/249.02 |
| 8,444,287 B2 | 5/2013 | Hardesty | 362/153 |
| 8,479,424 B1 | 7/2013 | Martin et al. | 40/576 |
| 8,572,919 B1 | 11/2013 | Neill et al. | 52/466 |
| D715,274 S | 10/2014 | Callas | A47G 27/0231 D14/230 |
| 8,851,701 B2 * | 10/2014 | Van Herpen | D05C 17/023 362/153 |
| 8,859,073 B1 | 10/2014 | Callas | 428/95 |
| 8,898,972 B2 | 12/2014 | Chen | 52/177 |
| 8,966,847 B2 | 3/2015 | Kessler et al. | 52/466 |
| 9,068,720 B2 | 6/2015 | Mangus | 362/153 |
| D735,494 S | 8/2015 | Wendling | A47G 11/00 D06/583 |
| 9,129,513 B1 | 9/2015 | Clarke et al. | 73/862.046 |
| D749,062 S | 2/2016 | Callas | H01Q 7/00 D14/230 |
| 9,305,472 B1 | 4/2016 | Pitts | 40/586 |
| 9,309,657 B2 | 4/2016 | Irwin et al. | 428/192 |
| 9,347,634 B2 | 5/2016 | Salter et al. | 330/104 |
| D766,011 S | 9/2016 | Logan | A61G 13/121 D06/596 |
| 9,475,426 B1 | 10/2016 | Bobo et al. | 362/153 |
| 9,651,230 B1 * | 5/2017 | Girolami | F21V 21/145 |
| D789,028 S | 6/2017 | Wynn | A21B 3/15 D02/500 |
| 9,741,273 B1 * | 8/2017 | Curtis | G02B 5/0278 |
| 2003/0071933 A1 | 4/2003 | Ohta et al. | 349/61 |
| 2006/0082465 A1 | 4/2006 | Grzan et al. | 340/665 |
| 2006/0177626 A1 | 8/2006 | Johnson et al. | A47G 27/0231 428/99 |
| 2007/0258255 A1 | 11/2007 | Kessler et al. | 362/487 |
| 2007/0263380 A1 | 11/2007 | Hamar et al. | 362/153 |
| 2009/0126139 A1 | 5/2009 | Batti et al. | A47G 27/0243 15/216 |
| 2010/0079985 A1 | 4/2010 | Prosey | 362/183 |
| 2011/0096531 A1 * | 4/2011 | Frey | G02F 1/133305 362/97.4 |
| 2011/0254470 A1 * | 10/2011 | Penoyer | F21S 2/005 315/313 |
| 2011/0310595 A1 * | 12/2011 | Hardesty | E04F 15/02166 362/153 |
| 2013/0269112 A1 * | 10/2013 | Legare | A47G 9/062 5/648 |
| 2014/0254158 A1 | 9/2014 | Mangus | 362/249.05 |
| 2014/0328052 A1 | 11/2014 | Hochman et al. | 362/147 |
| 2015/0035440 A1 | 2/2015 | Spero | 315/153 |
| 2016/0037610 A1 | 2/2016 | Kiser | 315/153 |
| 2016/0037949 A1 | 2/2016 | Dawson et al. | A47G 27/0206 428/95 |
| 2016/0374991 A1 | 12/2016 | Chiang | A47G 27/0212 428/76 |
| 2017/0112300 A1 | 4/2017 | Paulat | A47G 9/062 |
| 2017/0215618 A1 | 8/2017 | Park et al. | A47G 27/02 |
| 2017/0273490 A1 | 9/2017 | McMahan | A47G 27/0231 |
| 2018/0020858 A1 | 1/2018 | Gloeckl | A47G 27/0231 |
| 2018/0042420 A1 | 2/2018 | Johnson et al. | A47G 27/0231 |
| 2018/0153328 A1 | 6/2018 | Girard | A47G 27/02 |

* cited by examiner

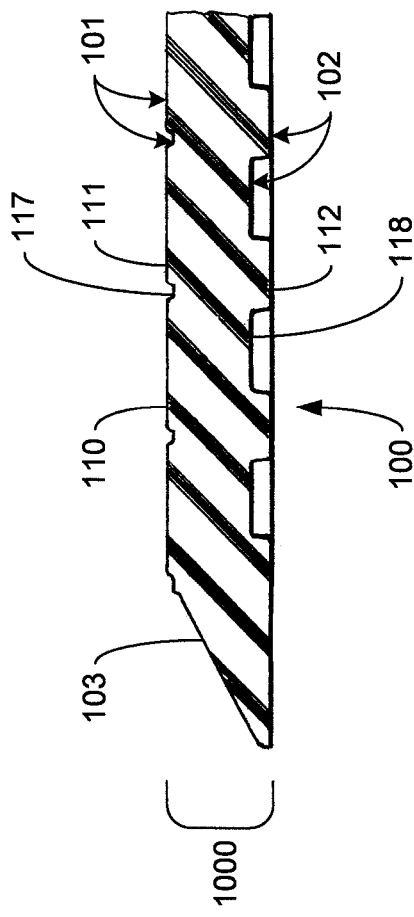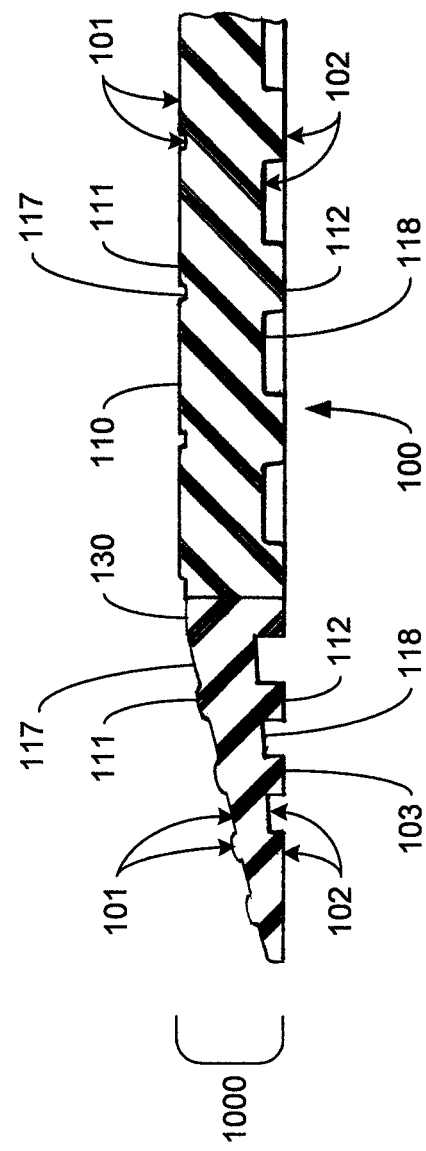

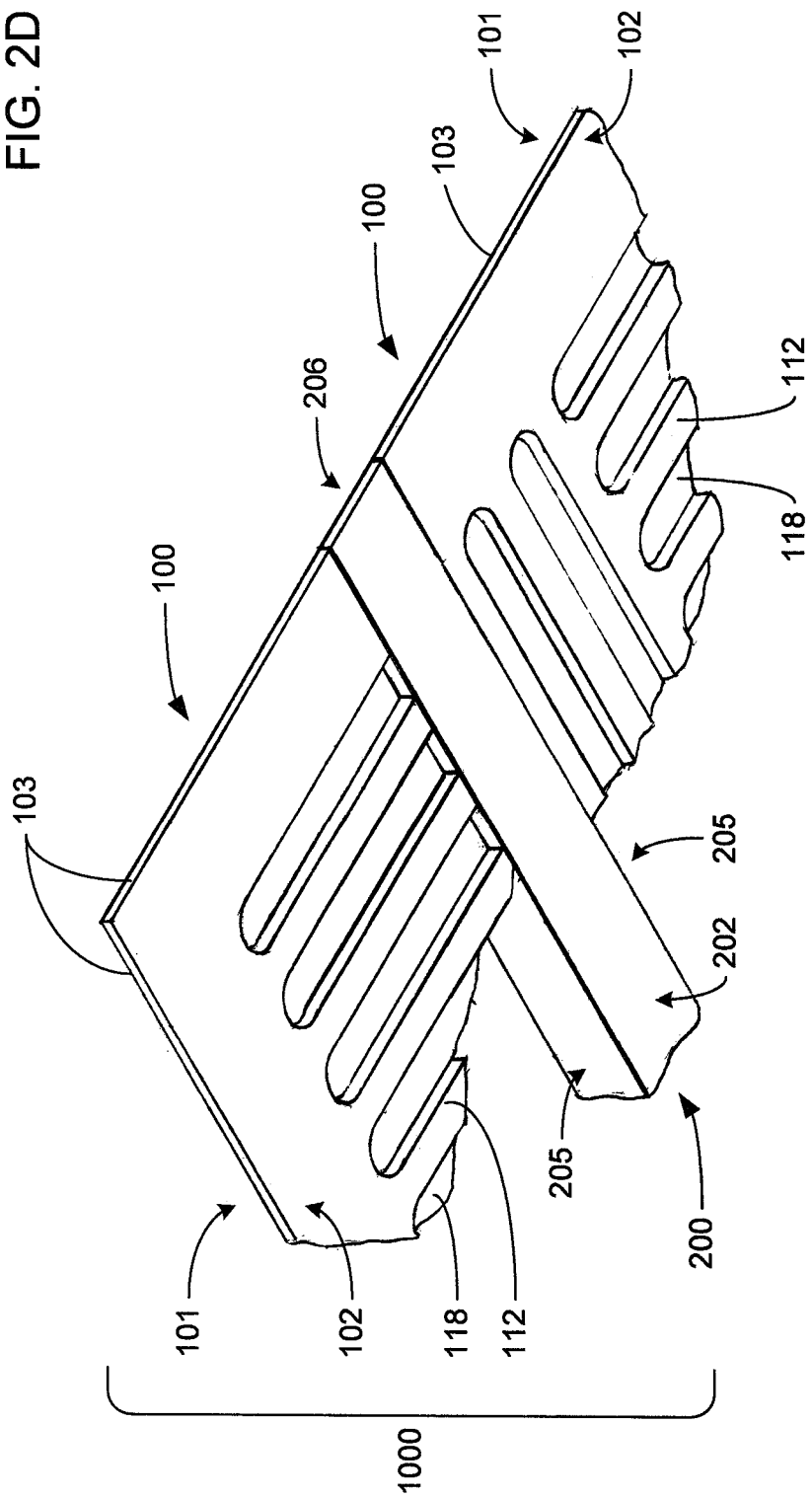

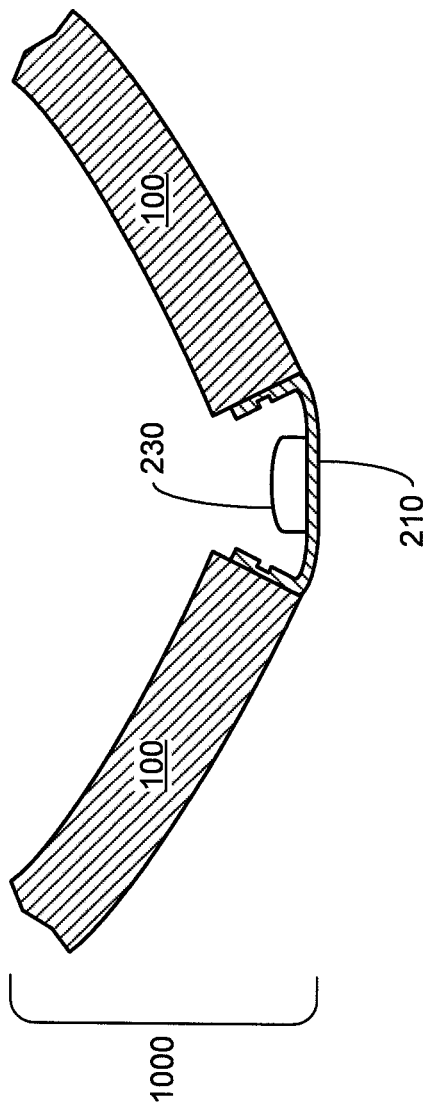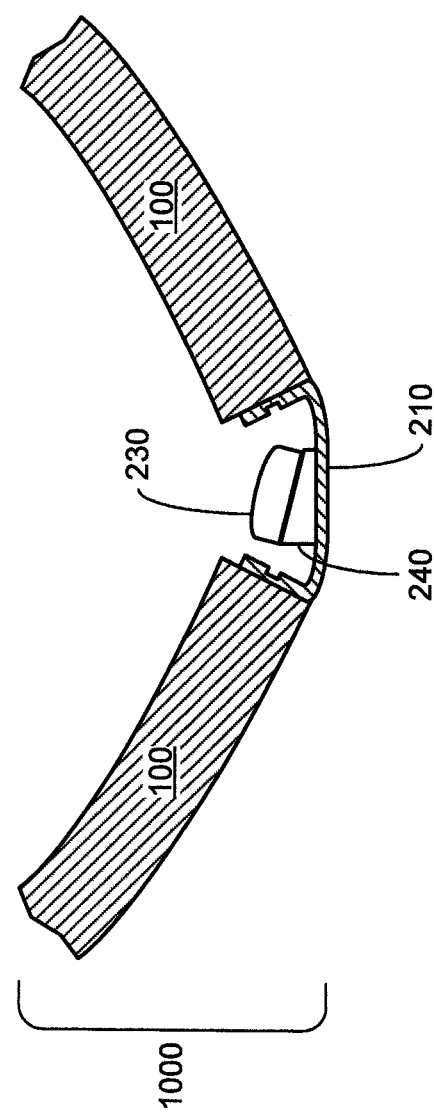

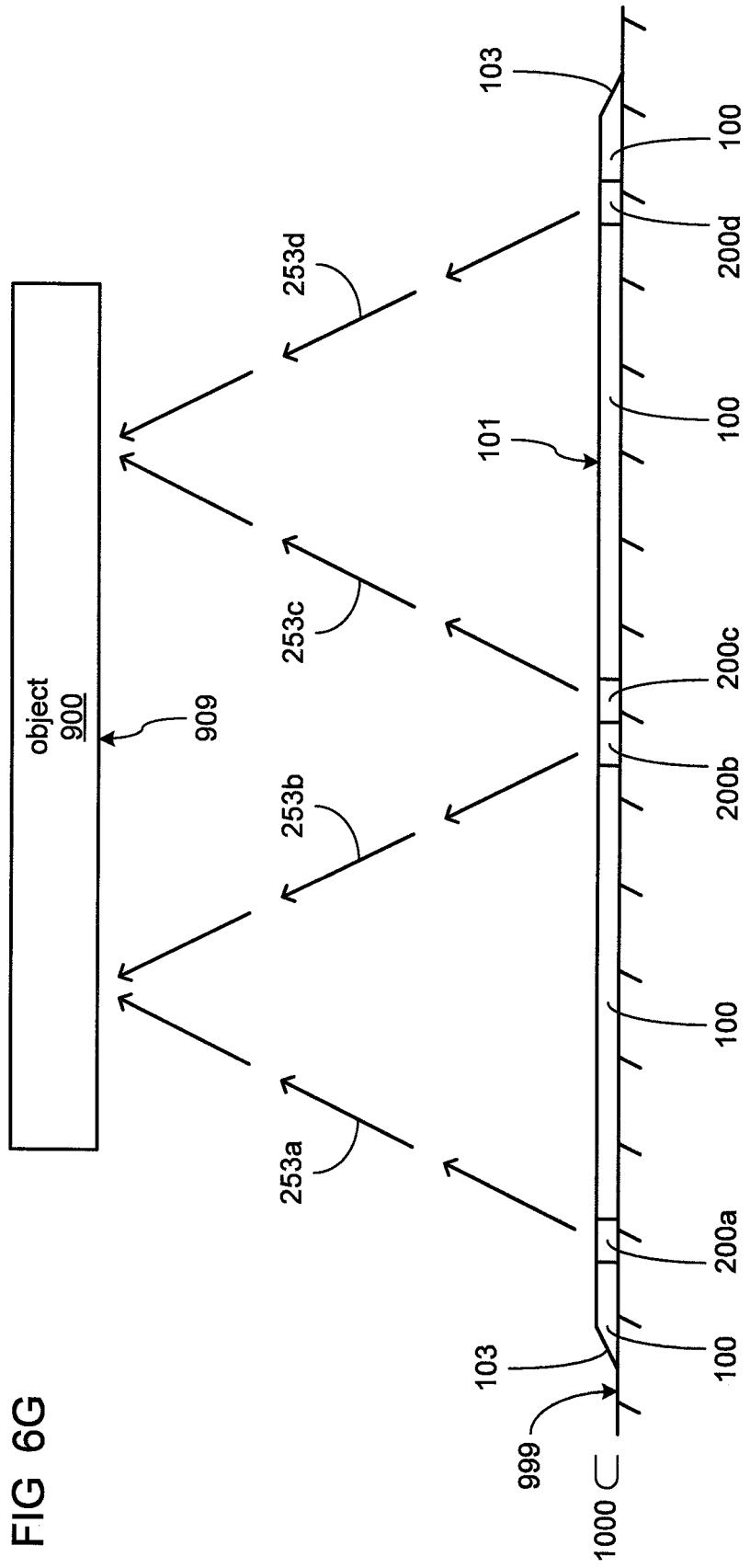

FLEXIBLE FLOOR MAT INCORPORATING LED LIGHTING

REFERENCE TO PROVISIONAL APPLICATION

This Utility application claims the benefit of the filing date of Provisional Application Ser. No. 62/497,863 filed Dec. 6, 2016 by John Joseph Girard, the disclosure of which is incorporated herein by reference in its entirety. This Utility application is also a continuation-in-part of Design patent application Ser. No. 29/628,227 filed Dec. 3, 2017, herewith by John Joseph Girard and Claus Munch Lendal, and entitled RECHARGEABLE UP-LIGHTING FLOOR MAT, the disclosure of which is also incorporated herein by reference in its entirety.

BACKGROUND

The present invention relates to the field of safety equipment for use in work environments that may present safety concerns related at least to lighting and/or hard floor surfaces. More specifically, the present invention relates to equipment and methods to prevent accidents and/or reduce fatigue issues associated with objects that may be suspended overhead, objects that may extend outwardly from walls, and/or objects that may be positioned about a walking surface.

In various utility room, workshop, maintenance facility and/or factory floor environments, there is often a need to position equipment and/or materials at various locations relative to walking areas that can create a variety of hazards and/or conditions for inducing fatigue. By way of example, where automobiles and/or parts of automobiles need to be suspended overhead to enable manufacturing and/or repairs thereof, risks of head impacts may be created. In such situations, it is usually deemed highly desirable to provide sufficient lighting as to allow such suspended objects to be seen clearly, and thereby avoided. However, the suspension of such objects overhead often blocks out typical overhead lighting, and it has become a commonplace practice to compensate for such reduced lighting by placing lighting devices at various locations on walking surfaces underneath such suspended objects. Unfortunately, this commonplace practice often mitigates one hazard by creating another in which personnel, who keep their gaze upward to watch for overhead hazards, may be caused to trip over such lighting devices and/or the power cords therefor that are located at the level of their feet.

By way of another example, materials for transport and/or used as supplies in a manufacturing or construction project may be stored against walls and/or stacked in rows with walkway space allocated therebetween under conditions that prevent typical overhead lighting solutions from being effective. It may be that stacks and/or shelves full of such materials may be so high as to create a kind of "canyon effect" in which sufficient overhead lighting is simply not able to penetrate far enough down between such stacks and/or shelves as to effectively light walkways so as to allow personnel to see trip hazards. Also, such poor lighting located down within such "canyons" may prevent personnel from recognizing hazards arising from objects extending outwardly toward them from stacks and/or shelves of such materials.

By way of still another example, where various utility services and/or machinery are in the process of being repaired, there is often a need to turn off electric power such that personnel are forced to resort to the use of flashlights, headlamps and/or other portable lighting devices that may need to be positioned at awkward locations. In such situations, personnel are often forced to contend with the use of portable point light sources that can create shadows that hide objects that need to be seen, that must be physically supported in a cumbersome manner using a hand or other body portion, and/or that may need to be positioned on a walking surface at a location that creates a trip hazard. Again, in an effort to mitigate one hazard, another hazard may be created.

SUMMARY

The present invention addresses such needs and deficiencies as are explained above by providing portable and resilient floor mats that incorporate one or more up-lighting components to cause one or more strips of illumination lighting to be emitted through portions of the upper surface of the floor mats at one or more locations. Such floor mats may be positioned in an industrial or other environment where personnel are engaged in work with material, manufactured goods and/or machinery that is positioned or moving over their heads and/or at other locations in close proximity to walls or walkways.

Such environments may include assembly lines in which goods that are being manufactured are suspended over the heads of personnel to enable the installation of components thereunder. Such environments may include repair facilities at which machinery is routinely suspended over the heads of personnel to render underside portions thereof more accessible to better enable repairs to be made. Such environments may include machine rooms in which climate control, power distribution, water filtering, elevator machinery and/or other machinery may be positioned in a manner in which at least portions thereof may extend into or alongside walkways and/or may be suspended overhead. Such environments may include material storage facilities and/or other forms of warehouse storage in which materials are stored on tall vertical shelving and/or in tall vertical stacks such that overhead lighting may be ineffective at reaching lower levels, including floor surfaces.

More specifically, a floor mat embodying the invention may be positioned on a support surface (e.g., a floor) adjacent to and/or underneath such objects or machinery to provide a cushioned surface on which personnel may stand, walk or kneel, while also providing up-lighting from the floor mat toward objects or machinery positioned alongside walls, walkways and/or overhead. The provision of such a cushioning floor mat may aid in mitigating physical fatigue, and/or avoiding stress-related and other injuries caused by prolonged periods of standing. The cushioned surfaces of such mats may also aid in reducing the likelihood of at least serious injury arising from an accidental fall by personnel leading to an impact with a hard floor surface.

The provision of such up-lighting within such a floor mat may increase safety by obviating the need to position various lamps on a floor where they can become a trip hazard to personnel who may be too engaged in their work with objects or machinery extending toward them at the level of their torsos or heads, and/or positioned over their heads, to remain aware of the locations of such lamps and/or the power cords used to provide electric power thereto. Up-lighting components may be positioned and/or oriented within the material of such a floor mat to concentrate greater illumination on particular overhead and/or other locations that are of greater interest to personnel engaged in work on particular portions of objects or machinery.

Alternatively or additionally, up-lighting components may be positioned and/or oriented within the material of such a floor mat to provide guidance to personnel as to the locations of preferred walkways and/or hazardous areas. In so doing, color coding and/or various flashing patterns may be incorporated into such up-lighting components.

BRIEF DESCRIPTION OF THE DRAWINGS

A fuller understanding of what is disclosed in the present application may be had by referring to the description and claims that follow, taken in conjunction with the accompanying drawings, wherein:

FIG. 2A is a cross-sectional view of an embodiment of a portion of the floor matting of the up-lighting floor mat of FIGS. 1A-D showing details of the structure and of the assembly thereof.

FIG. 2B is a cross-sectional view of an alternate embodiment of a portion of the floor matting of the up-lighting floor mat of FIGS. 1A-D showing details of the structure and of the assembly thereof.

FIG. 2D is a perspective view of a portion of a bottom surface of the corner of the up-lighting floor mat of FIG. 2C.

FIG. 5A is a cross-sectional view of a portion of the up-lighting floor mat of FIGS. 1A-D showing details of the relative flexibility of a U-channel of an embodiment up-lighting assembly and of the floor matting thereof.

FIG. 5B is a cross-sectional view of a portion of the up-lighting floor mat of FIGS. 1A-D showing details of the relative flexibility of a U-channel of an alternate embodiment up-lighting assembly and of the floor matting thereof.

FIG. 6G is an elevational view from an edge of the up-lighting floor mat of FIG. 6F showing details of the use of pairs of up-lighting assemblies thereof to directionally emit light in a triangulated manner to improve visibility of a portion of a surface of an object.

DETAILED DESCRIPTION

FIGS. 1A through 1D, taken together, depict various aspects of an up-lighting floor mat 1000, which may include floor matting 100, at least one up-lighting assembly 200 and/or at least one power source 300 to provide electric power for the at least one up-lighting assembly 200.

Figure 1A:
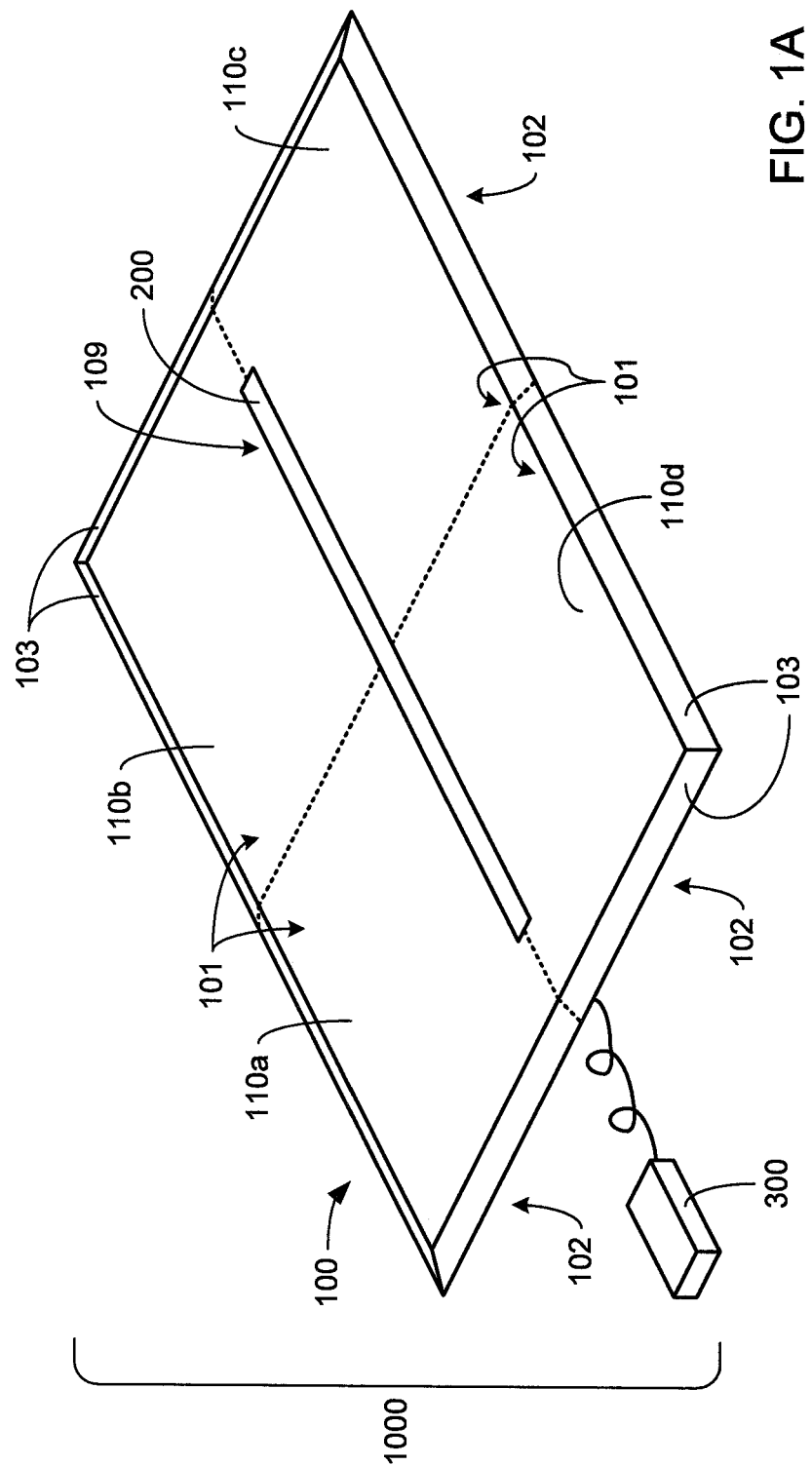
FIG. 1A is a perspective view of an example embodiment of an up-lighting floor mat.

As best appreciated by viewing FIG. 1A, the up-lighting floor mat 1000 may have a generally planar shape with outer edge portions 103. When placed flat atop a floor or other support surface, the generally planer shape of the up-lighting floor mat 1000 may define an upwardly-facing surface 101 to support personnel standing and/or walking thereon, and a opposed downwardly-facing surface 102 by which the up-lighting floor mat 1000 may, itself, be supported by a floor or other support surface. As depicted, at least a subset of the edge portions 103 may be shaped to form one or more ramps by which trip hazards to personnel may be minimized and/or by which carts and/or other rolling objects may be more easily rolled onto and/or off of the up-lighting floor mat 1000.

The floor matting 100 may be formed from any of a variety of flexible materials, including various forms of flexible plastic and/or rubber-based materials, including and not limited to, open cell polyurethane foam. The floor matting 100 may be so formed using any of a variety of manufacturing technologies, including and not limited to, various forms of molding, extrusion, and/or additive manufacturing (e.g., 3D printing) technologies.

Figure 1B:
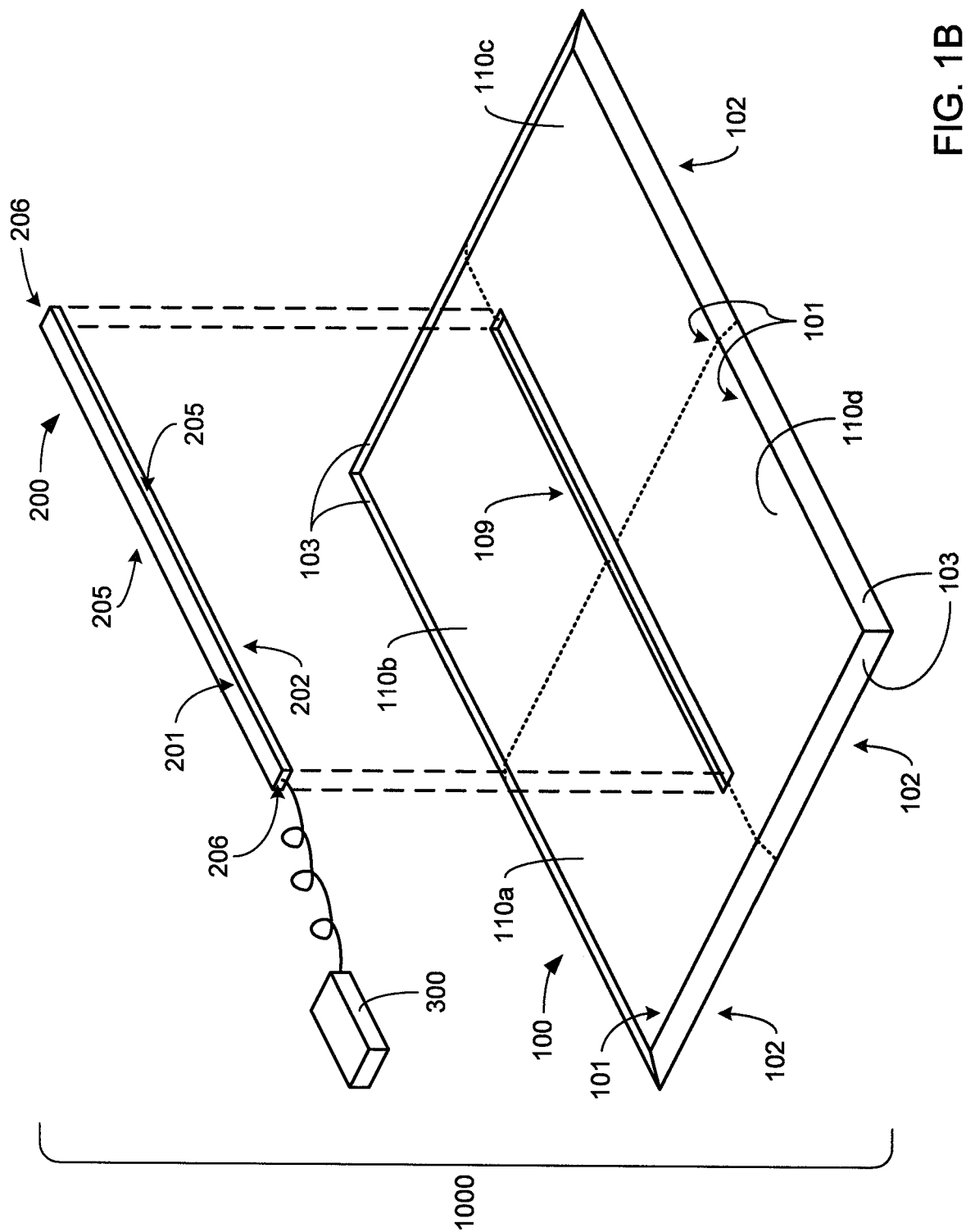
FIG. 1B is an exploded perspective view of the up-lighting floor mat of FIG. 1A showing details of an up-lighting assembly thereof and a slot formed in floor matting thereof to receive the up-lighting assembly.
Figure 1C:
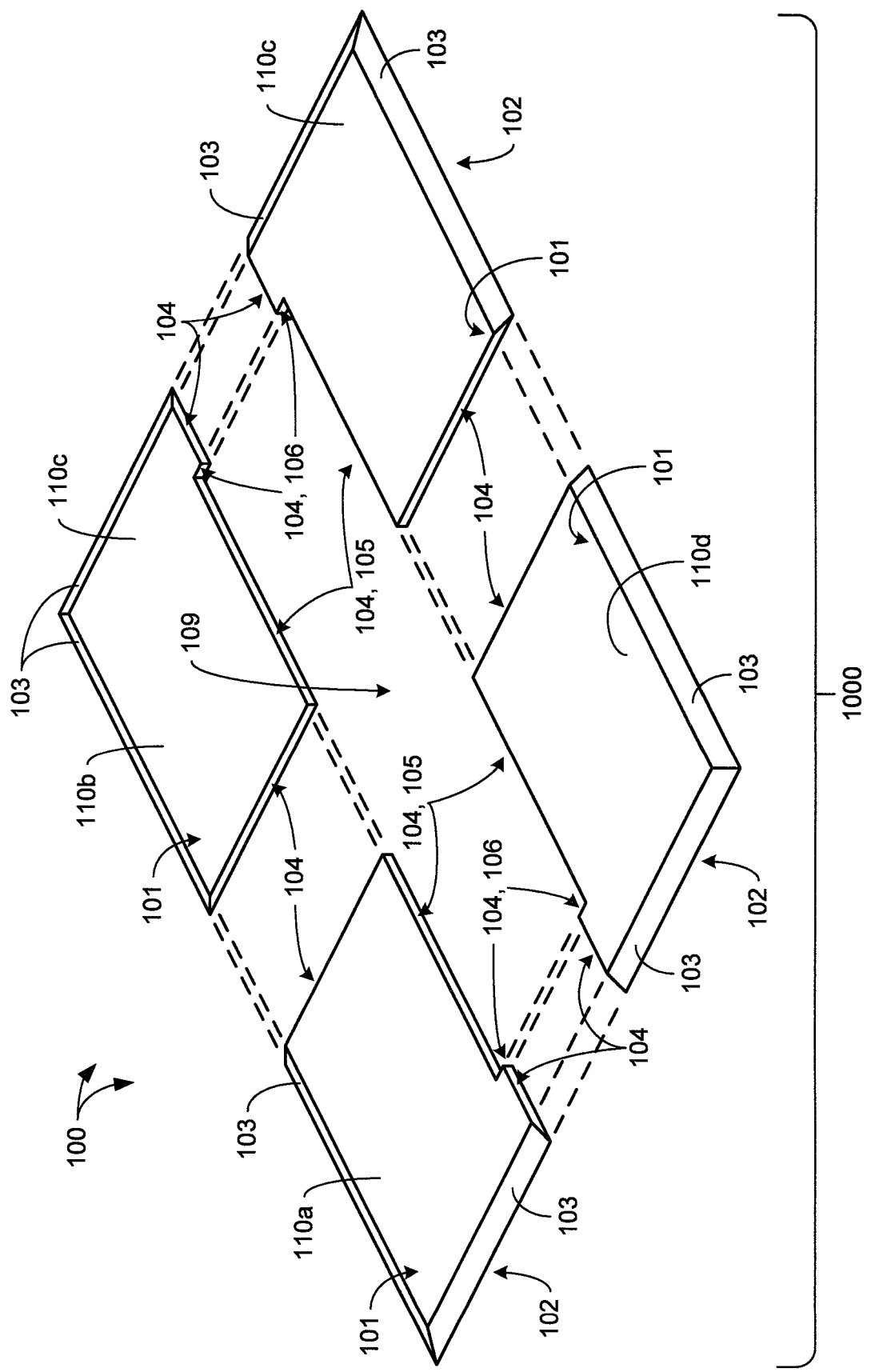
FIG. 1C is an exploded perspective view of the floor matting of the up-lighting floor mat of FIG. 1A showing details of the formation of the floor matting.
Figure 1D:
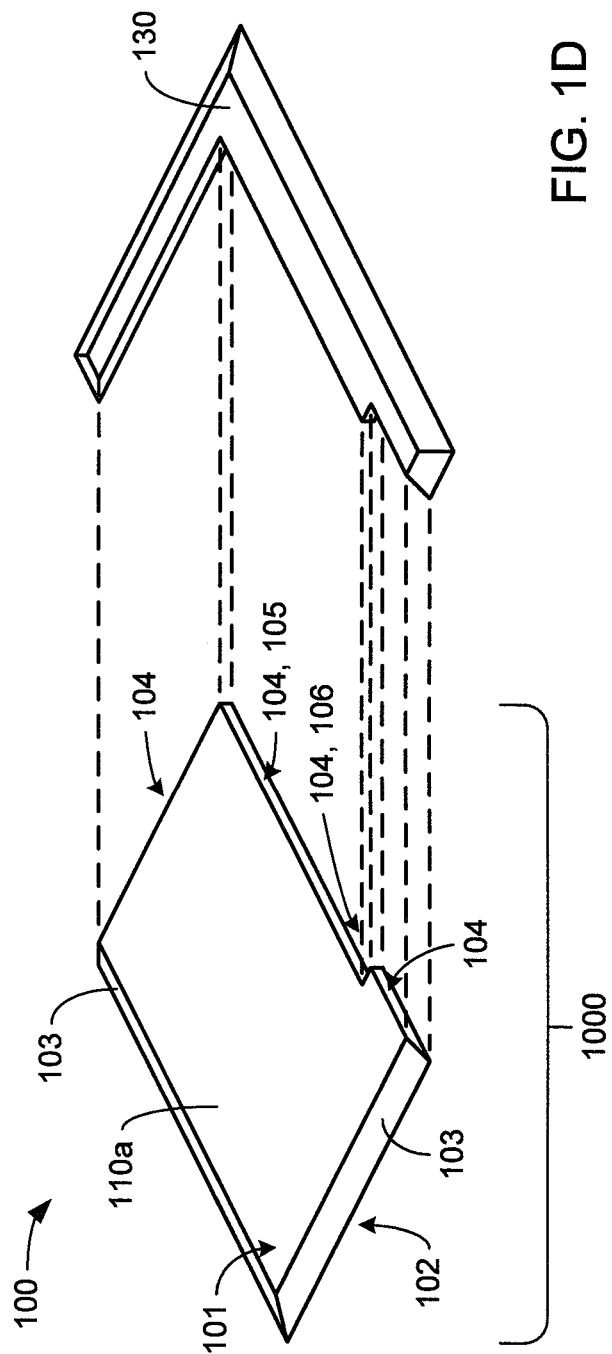
FIG. 1D is an exploded perspective view of a mat portion of the floor matting of FIG. 1C showing details of trimming of the mat portion as part of assembling the floor matting of FIG. 1C.

As can best be seen in FIGS. 1C-D, in some embodiments, the floor matting 100 of the up-lighting floor mat 1000 may be assembled from multiple mat portions 110, such as the specifically depicted mat portions 110a through 110d. In embodiments in which each of the mat portions 110a-d were originally separately formed as complete mats, each of the mat portions 110a-d may originally have been formed with edges that provide ramps about the entirety of each of their peripheries. Alternatively, in embodiments in which each of the mat portions 110a-d is formed as at least a portion of a roll of mat material, only an opposed pair of the edges of each of the mat portions 110a-d may provide ramps.

Regardless of the exact manner in which each of the multiple mat portions 110a-d may have been formed, as part of assembling an embodiment of the up-lighting floor mat 1000 from the multiple mat portions 110a-d, portions of such ramps may be trimmed off of one or more of the multiple mat portions 110a-d, thereby becoming cuttings 130. Following such trimming, at least a subset of the resulting cut edges 104 of each of the mat portions 110a-d may then be glued together (or otherwise bonded or affixed together) in any of a variety of ways to form the floor matting 100 of the up-lighting floor mat 1000. To enable such gluing together (or other form of adhering or bonding together) of the cut edges 104, at least a subset of the cut edges 104 may be "straight-cut" (e.g., cut in a manner that defines a flat cut edge surface that is oriented perpendicularly to the surfaces 101 and 102).

In such embodiments, the need to assemble the up-lighting floor mat 1000 from the multiple mat portions 110a-d may be used as an opportunity to utilize at least a subset of the cut edges 104 to provide edges 105 and/or define ends 106 of a slot 109 (best seen in FIG. 1B) within which an up-lighting assembly 200 may be positioned. In other embodiments in which the floor matting 100 is not assembled from multiple mat portions 110 such that the up-lighting floor mat 1000 is formed from a single piece of floor matting 100, the slot 109 may be cut into such a single piece of floor matting 100. Thus, in such other embodiments, the edges 105 and/or the ends 106 of a slot 109 may be created in a manner that does not entail the creation of cut edges 104 from preparations to combine multiple mat portions 110.

As depicted in FIG. 1B, the lighting assembly 200 may be elongate in shape with a generally rectangular cross-section that defines an upwardly-facing surface 201, a downwardly-facing surface 202, a pair of opposed lengthwise edges 205, and a pair of opposed ends 206. As part of assembling the lighting assembly 200 together with one or more mat portions 110 to form the up-lighting floor mat 1000, the lengthwise edges 205 may be glued to (or otherwise affixed to or bonded together with) matting material 100 that provides corresponding edges 105, and/or the ends 206 may be glued to (or otherwise affixed to or bonded together with) matting material 100 that defines corresponding ends 106.

The lighting assembly 200 may have a shape and/or dimensions that enable the lighting assembly 200 to be assembled together with the floor matting 100 such that the upwardly-facing surface 201 is able to be aligned in one plane with the upwardly-facing surface 101 simultaneously with the downwardly-facing surface 202 being aligned in another plane with the downwardly-facing surface 201. The edges 205 and/or the ends 206 may define edge surfaces that may be oriented perpendicularly to the surfaces 201 and 202 of the lighting assembly 200 in a manner similar to how the edge surfaces defined by the cut edges 104 (which may provide edges 105 and/or ends 106) may be oriented perpendicularly to the surfaces 101 and 102 of the floor matting 100. Again, this may be done to enable gluing together (or another form of adhering or bonding together) of the edges 205 with the edges 105, and/or the ends 206 with the ends 106.

Returning to FIG. 1A, a cable conveying electricity from the power source 300 to the lighting assembly 200 may extend from the power source 300 to one of the ends 206. The power source 300 may be any of a variety of types of power source, including and not limited to, a battery or a power supply that receives AC mains power (e.g., a Class II 60 W or 120 W power supply that receives AC from wall socket) and employs such AC mains power to generate electric power of appropriate characteristics (e.g., AC or DC, voltage and/or amperage, pulse-width modulation, etc.) appropriate for use with light-emitting components of the lighting assembly 200.

It should be noted that, although FIGS. 1A-D depict the up-lighting floor mat 1000 as having a generally rectangular shape defined by its outer edges 103, and as including only a single up-lighting assembly 200 within a single slot 109 to provide a single strip of up-lighting, other embodiments of the up-lighting floor mat 1000 are possible in which the outer edges 103 may define any of a variety of shapes and/or that may incorporate multiple ones of the up-lighting assembly 200.

Turning to FIGS. 2A through 2D, the upwardly-facing surface 101 may be a bi-level surface incorporating a combination of upwardly-extending projections 111 and upwardly-facing recesses 117 that are shaped and/or arranged in a pattern selected to reduce incidents of skidding on the upwardly-facing surface 101 by personnel standing and/or walking thereon. Correspondingly, the downwardly-facing surface 201 may be a bi-level surface incorporating a combination of downwardly-extending projections 112 and downwardly-facing recesses 118 that are shaped and/or arranged in a pattern selected to reduce incidents of skidding of the up-lighting floor mat 1000 on a floor or other support surface.

As depicted, at least a subset of the upwardly-extending projections 111 may be positioned on the upwardly-facing surface 101 to overlie the positions of at least a subset of the downwardly-facing recesses 118 on the downwardly-facing surface 102, and/or at least a subset of the upwardly-opening recesses 117 may be positioned on the upwardly-facing surface 101 to overlie the positions of at least a subset of the downwardly-extending projections 112 on the downwardly-facing surface 102. This may be done in accordance with what is described in U.S. Pat. No. 5,863,637 issued Jan. 26, 1999, to Mansson et al (hereinafter referred to as "the Mansson patent") to enhance the degree of cushioning provided to personnel who stand and/or walk upon the up-lighting floor mat 1000. As described in the Mansson patent, upwardly-extending projections that are so positioned are able to be more easily pressed downward when stepped upon as a result of the material of the mat that is immediately underneath being able to move downward into downwardly-facing recesses that such upwardly-extending projections overlie. The disclosure of the Mansson patent is incorporated herein by reference in its entirety.

Regardless of whether there is such overlying positioning between any of the upwardly-extending projections 111 and any of the downwardly-facing recesses 118, or between any of the upwardly-facing recesses 117 and any of the downwardly-extending projections 112, the inclusion of one or both of the upwardly-facing recesses 117 and the downwardly-facing recesses 118 at regular intervals along at least one dimension of the up-lighting floor mat 1000 may create a series of thinner portions of the up-lighting floor mat 1000 that enable the up-lighting floor mat 1000 to be more easily rolled up for transport and/or storage. In some embodiments, at least some of the upwardly-facing recesses 117 may be positioned to overlie at least some of the downwardly-facing recesses 118 at regular intervals to create a series of still thinner portions of the up-lighting floor mat 1000 to further aid the rolling up thereof.

Turning more specifically to FIGS. 2A-B, in different embodiments, a ramp defined by an outer edge portion 103 of the floor matting 100 may be formed integrally with at least a portion of the floor matting 100 (as depicted in FIG. 2A). Alternatively, a ramp of an outer edge portion 103 may be separately formed and subsequently adhered to (or otherwise bonded or affixed to) at least a portion of the floor matting 100 (as depicted in FIG. 2B). By way of example, and as earlier discussed, such a separately formed ramp may be part of a cutting 130 from a mat portion 110 that was subsequently glued to (or otherwise adhered or affixed to) a cut edge 104 of a mat portion 110 to create such an outer edge portion 103. As also depicted, regardless of the exact manner in which a ramp of an outer edge portion 103 is formed, in different embodiments, such a ramp may be defined to provide a longer and more gradual slope (as depicted in FIG. 2B) or may be defined to provide a shorter and steeper slope (as depicted in FIG. 2A).

Figure 2C:
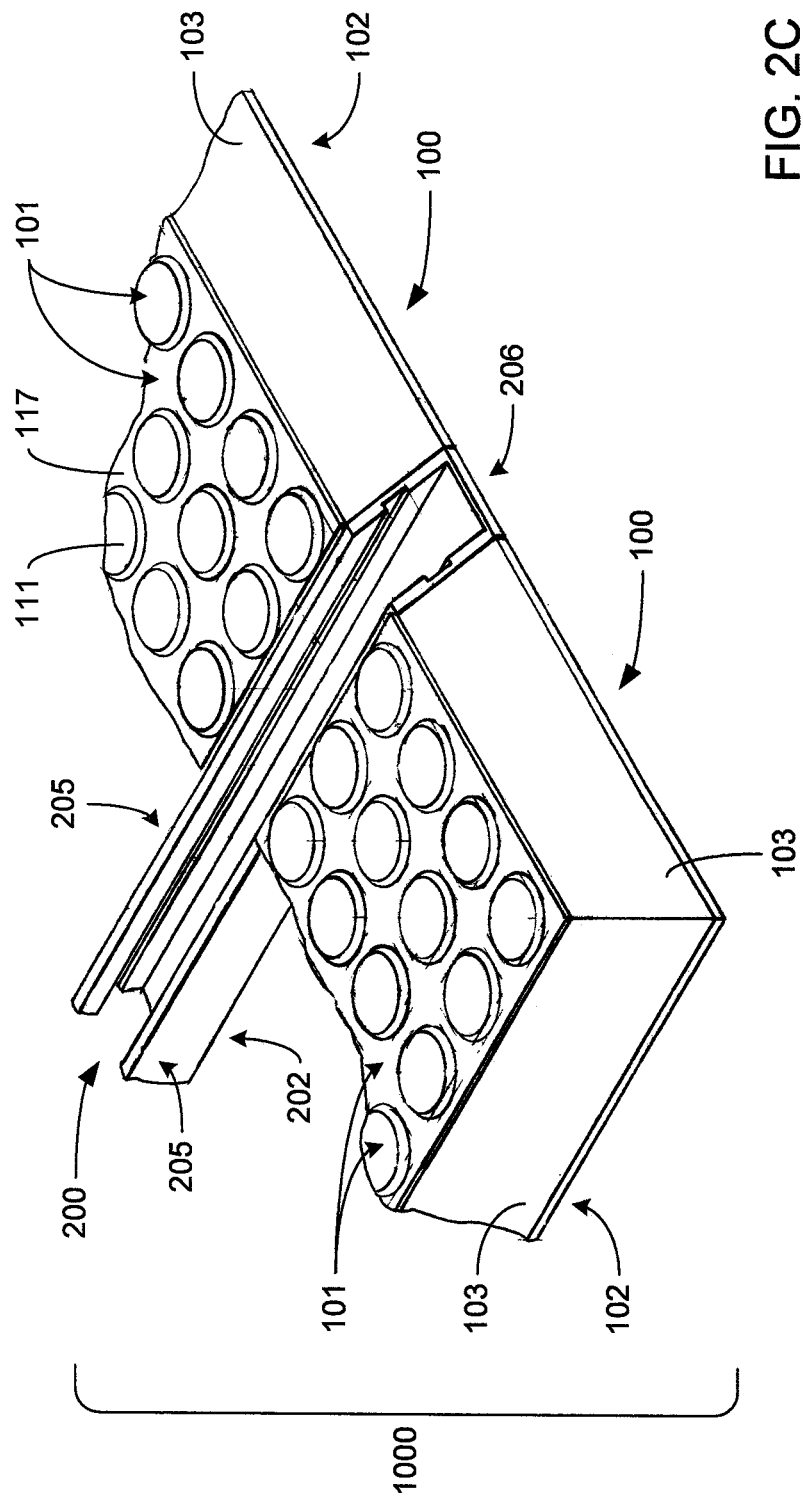
FIG. 2C is a perspective view of a portion of a top surface of a corner of an embodiment of an up-lighting floor mat in which a end of an up-lighting assembly emerges through an edge of the up-lighting floor mat.

Turning more specifically to FIGS. 2C-D, it should be noted that, although FIGURES 1A-D depict a slot 109 having been formed in a manner in which both ends thereof are closed such that there are distinct ends 106 formed to engage corresponding ends 206 of the depicted up-lighting assembly 200, other embodiments are possible in which a slot 109 may open through an outer edge 103 of the floor matting 100. More specifically, a slot 109 may be formed in a manner in which at least one end thereof extends through an outer edge 103 such that an end 206 of an up-lighting assembly 200 may extend to, and become part of, an outer edge 103. This may be done in such embodiments to enable access to an end 206 of an up-lighting assembly 200 to accommodate cabling conveying electricity from the power source 300.

Turning to FIGS. 3A through 3D, the up-lighting assembly 200 may include an upwardly-opening U-channel 210, a downwardly-opening diffuser 220 that may also have a U-channel cross-section, and an elongate light-emitting device 230. It may be the U-channel 210 that provides the lengthwise edges 205 to which portions of the floor matting 100 that define edges 105 of a slot 109 may be attached, and/or that provides the ends 206 to which portions of the floor matting 100 that define ends 106 of a slot 109 may be attached.

Figure 3A:
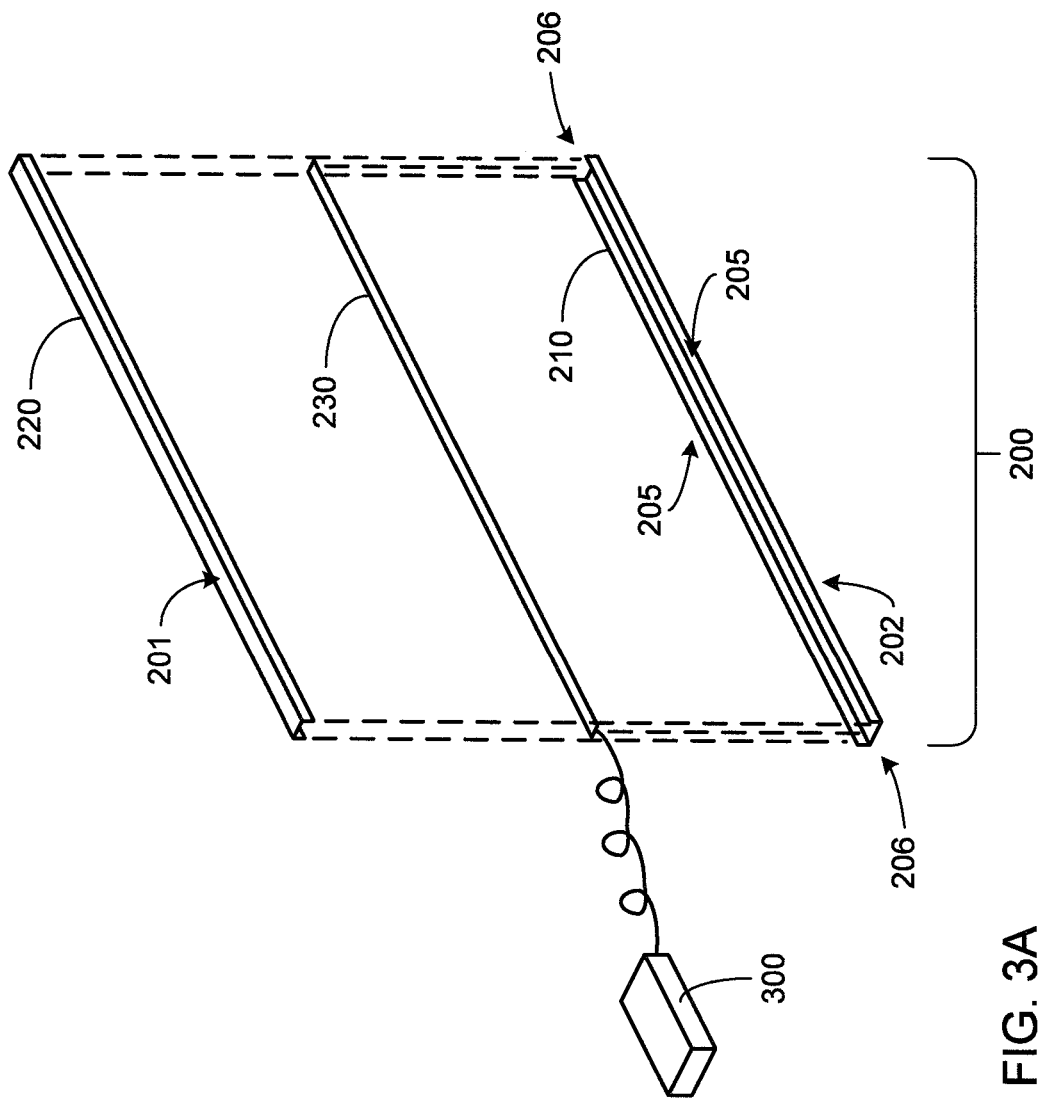
FIG. 3A is an exploded perspective view of an embodiment of the up-lighting assembly of the up-lighting floor mat of FIGS. 1A-D showing details of the insertion and covering of a light-emitting device thereof within a U-channel thereof.
Figure 3B:
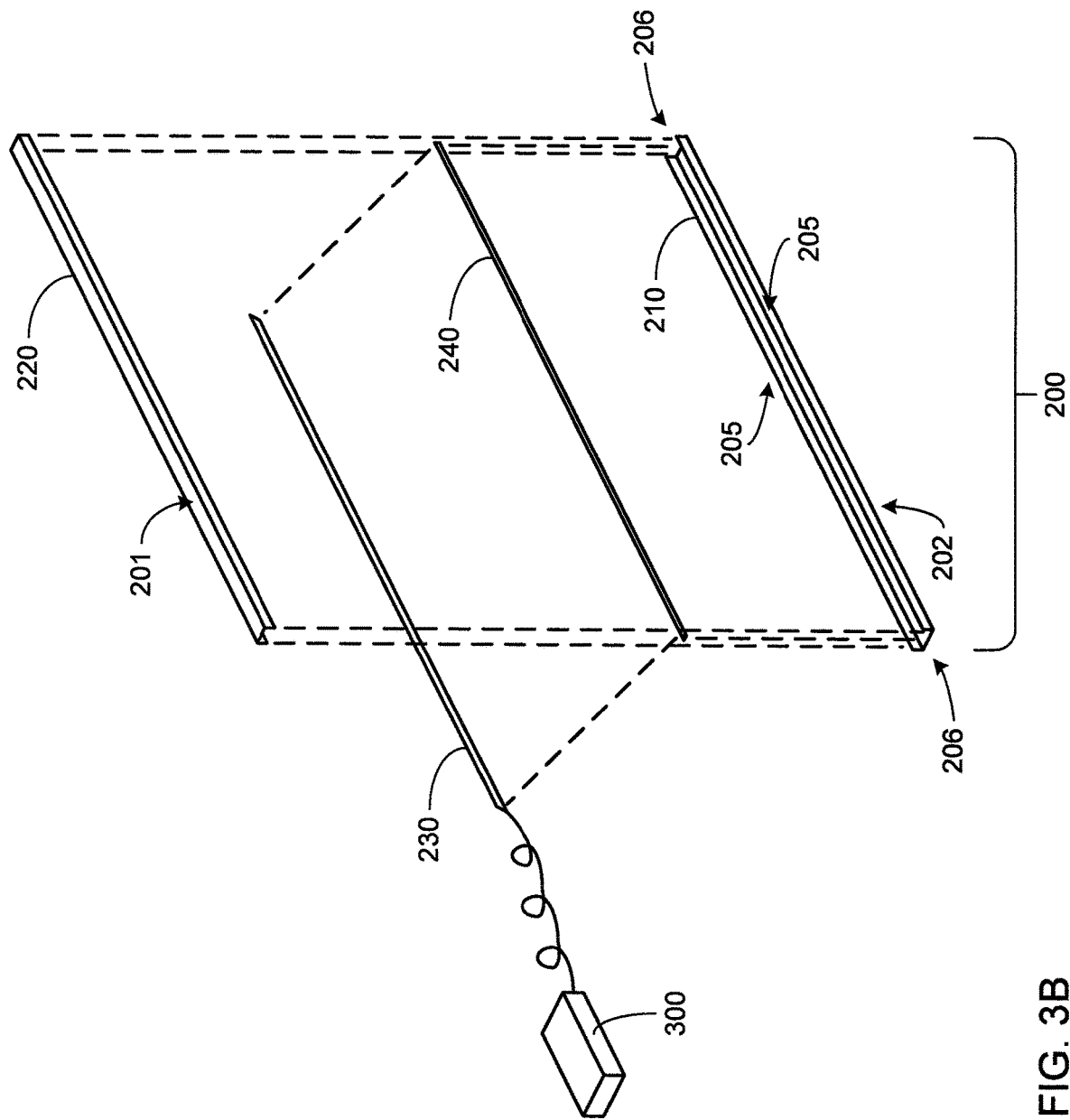
FIG. 3B is an exploded perspective view of an alternate embodiment of the up-lighting assembly of the up-lighting floor mat of FIGS. 1A-D showing details of the insertion and covering of a strip of resilient material along with a light-emitting device thereof within a U-channel thereof.

Turning more specifically to FIGS. 3A-B, as depicted, an up-lighting assembly 200 may be assembled prior to being assembled with the floor matting 100 of an up-lighting floor mat 1000. Alternatively, the U-channel 210 may be assembled with the floor matting 100 before the up-lighting assembly 200 is assembled such that the up-lighting assembly 200 is assembled in place within the up-lighting floor mat 1000. Regardless of the exact order of assembly, the U-channel 210 and the diffuser 220 may be assembled with their U-channel cross-sections open towards each other, thereby forming a generally rectangular tube-like structure within which the light-emitting device 230 may be positioned. As will be explained in greater detail, the light-emitting device 230 may emit light that may be highly directional in nature such that when positioned within the generally rectangular tube-like structure so created, the light-emitting device 230 may be oriented therein to direct the majority of its emitted light through the diffuser 220. As will also be explained in greater detail, a portion of a cutting 130 may also be positioned within the generally rectangular tube-like structure as a wedge-shaped strip 240 of flexible material to aid in setting the orientation of the light-emitting device 230.

Figure 3C:
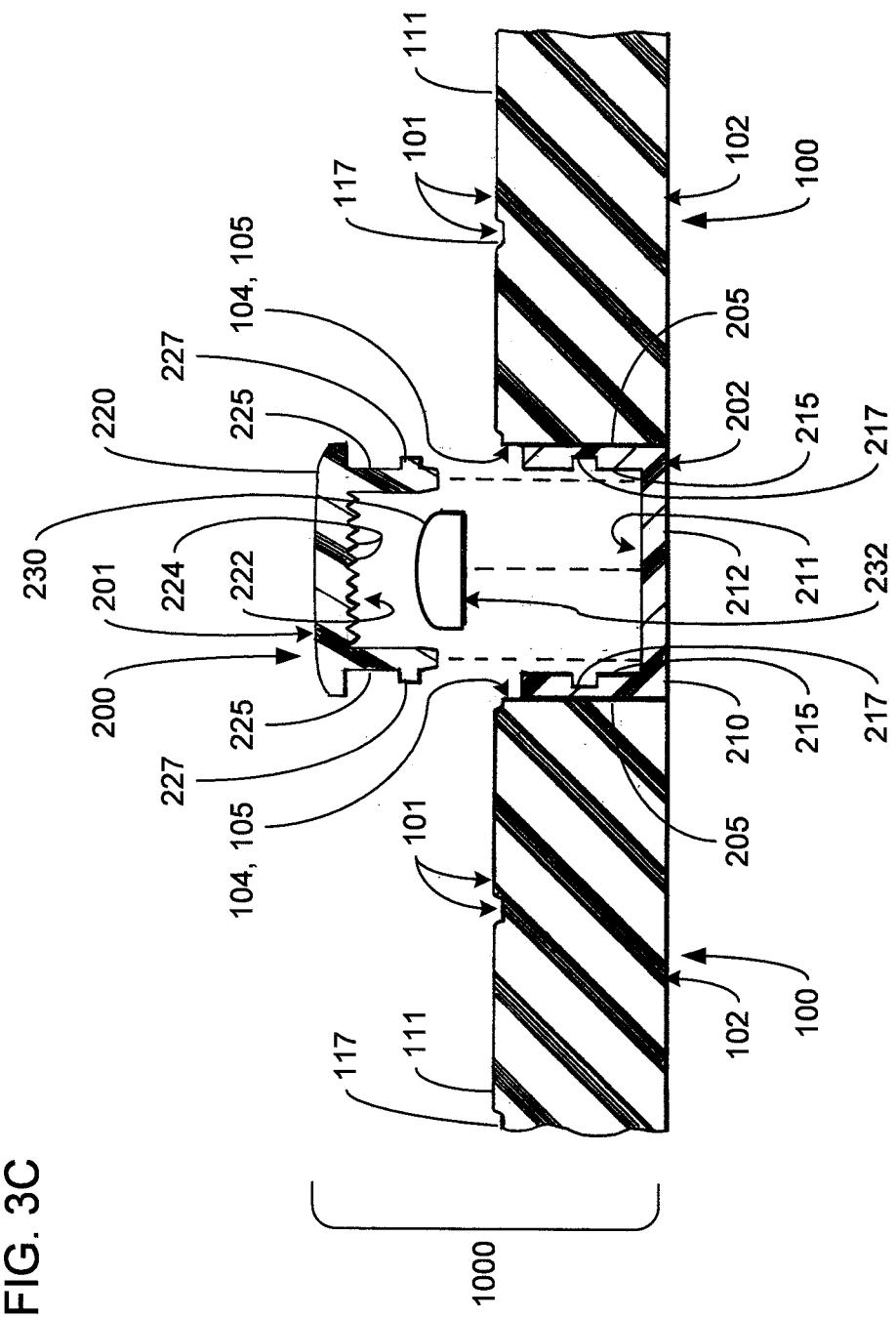
FIG. 3C is a cross-sectional view of a portion of the up-lighting floor mat of FIGS. 1A-D showing details of an embodiment of the assembly of the up-lighting assembly in place within the slot formed in the floor matting thereof.
Figure 3D:
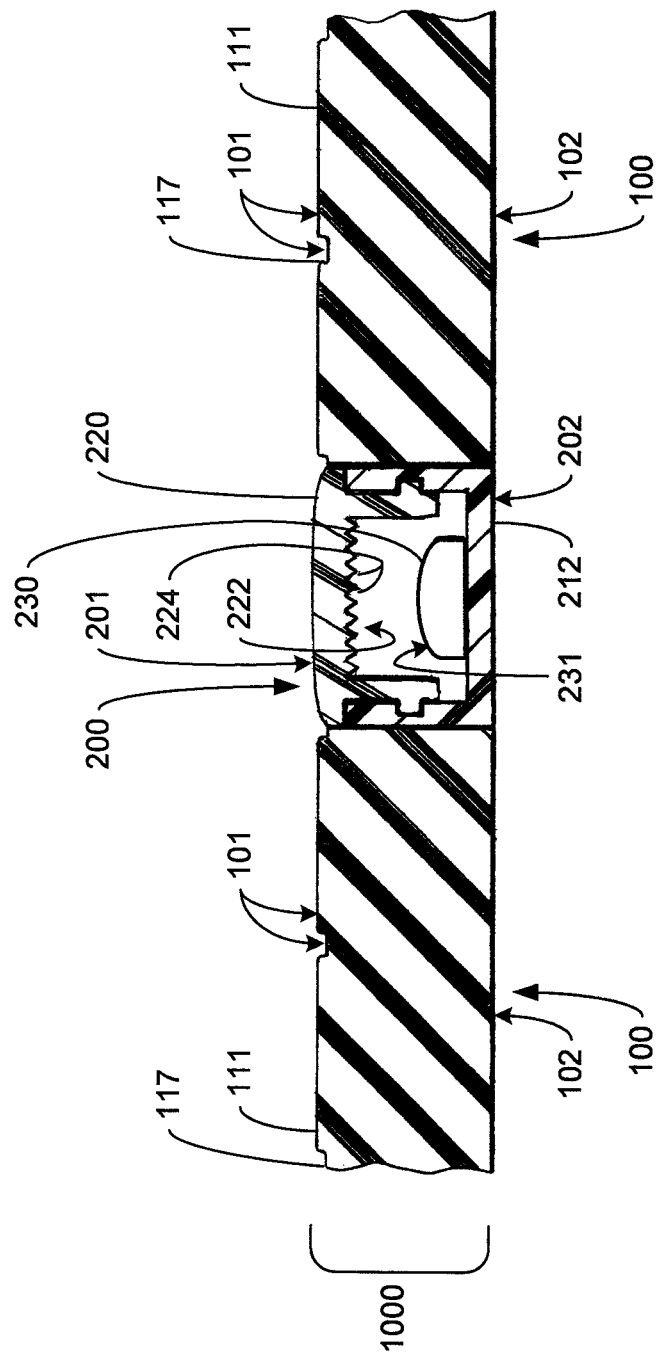
FIG. 3D is a cross-sectional view, similar to FIG. 3C, showing details of the up-lighting assembly as assembled.

Turning more specifically to FIGS. 3C-D, the U-channel cross-section of the upwardly-opening U-channel 210 may be defined by a pair of upwardly-extending portions 215 connected by a horizontally-extending bottom portion 212 (i.e., the bottom portion 212 extends transversely between and perpendicularly to the pair of upwardly-extending portions 215). The upwardly extending portions 215 may define the majority of (if not the entirety of) the elongate edges 205 of the up-lighting assembly 200 to which portions of the floor matting 100 that define edges 105 of a slot 109 may be attached. The horizontally-extending bottom portion 212 may define the downwardly-facing surface 202 of the up-lighting assembly 200, as well as an opposed upwardly-facing surface 211 inside the U-channel cross-section.

The U-channel cross-section of the downwardly-opening diffuser 220 may be defined by a pair of downwardly-extending portions 225 connected by a horizontally-extending top portion 221. Each of the downwardly-extending portions 225 may carry an outwardly-extending projection 227 that engages an inwardly-opening recess 217 defined by a corresponding one of the upwardly-extending portions 215 of the U-channel 210. The horizontally-extending top portion 221 may define the upwardly-facing surface 201 of the up-lighting assembly 200, as well as an opposed downwardly-facing surface 222 inside its U-channel cross-section. The downwardly-facing surface 222 may define ribbing 224 that extends lengthwise along the elongate length of the diffuser 220 in the form of a set of parallel-extending V-shaped grooves that perform the diffusing function of the diffuser 220.

The light-emitting device 230 may be made up of any of a variety of types of light-emitting components based on any of a variety of light-emitting technologies. As depicted, the light-emitting device 230 may have a generally rectangular cross-section with at least a distinct downwardly-facing mounting surface 232. However, as also depicted, the cross-section of the light-emitting device 230 may have a slightly curved or bulbous upper surface 231 through which the light-emitting device 230 may emit light. The downwardly-facing mounting surface 232 may carry a pressure-sensitive adhesive backing by which the downwardly-facing mounting surface 232 may be directly adhered to the upwardly-facing surface 211 of the upwardly-opening U-channel 210. With the light-emitting device 230 so affixed to the upwardly-facing surface 211, light emitted by the light-emitting device 230 through its slightly curved or bulbous upper surface 231 may then encounter the ribbing 224 of the diffuser, and thereby become more diffused as the light passes through the horizontally-extending top portion 221.

Turning to FIGS. 4A through 4F, the diffuser 220 may be formed from any of a variety of transparent and/or translucent materials, including various forms of rigid transparent plastic (e.g., polycarbonate plastic, acrylic, etc.) and/or ceramic materials. The diffuser 220 may be so formed using any of a variety of manufacturing technologies, including and not limited to, various forms of molding, extrusion, and/or additive manufacturing (e.g., 3D printing) technologies. Correspondingly, the upwardly-opening U-channel 210 may be formed from any of a variety of flexible materials, including various forms of flexible plastic (e.g., vinyl plastic, thermoplastic polyurethane, thermoplastic elastomer, etc.) and/or rubber-based materials. The U-channel 210 may be so formed using any of a variety of manufacturing technologies, including and not limited to; various forms of molding, extrusion, and/or additive manufacturing (e.g., 3D printing) technologies.

Figure 4A:
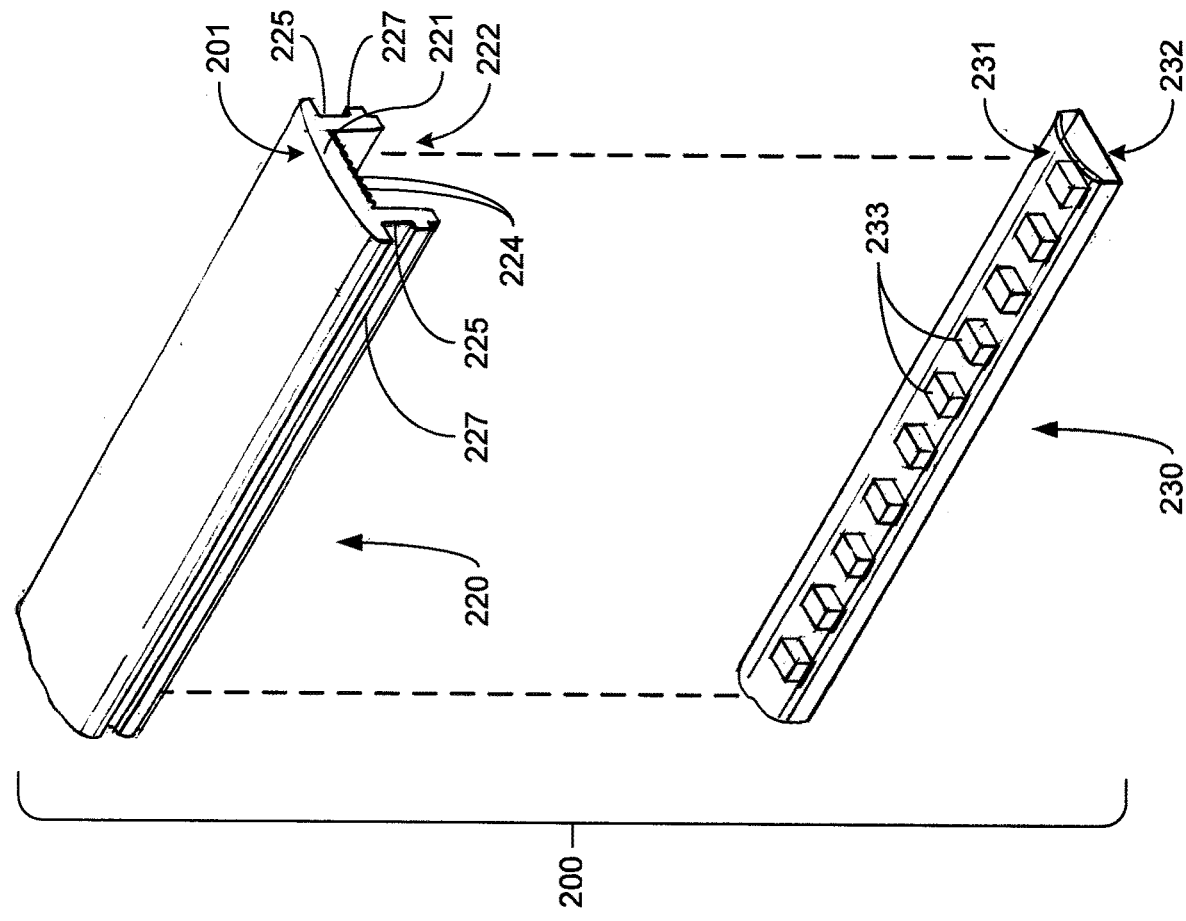
FIG. 4A is an exploded perspective view of a subset of the components of an embodiment of the up-lighting assembly of the up-lighting floor mat of FIGS. 1A-D.
Figure 4B:
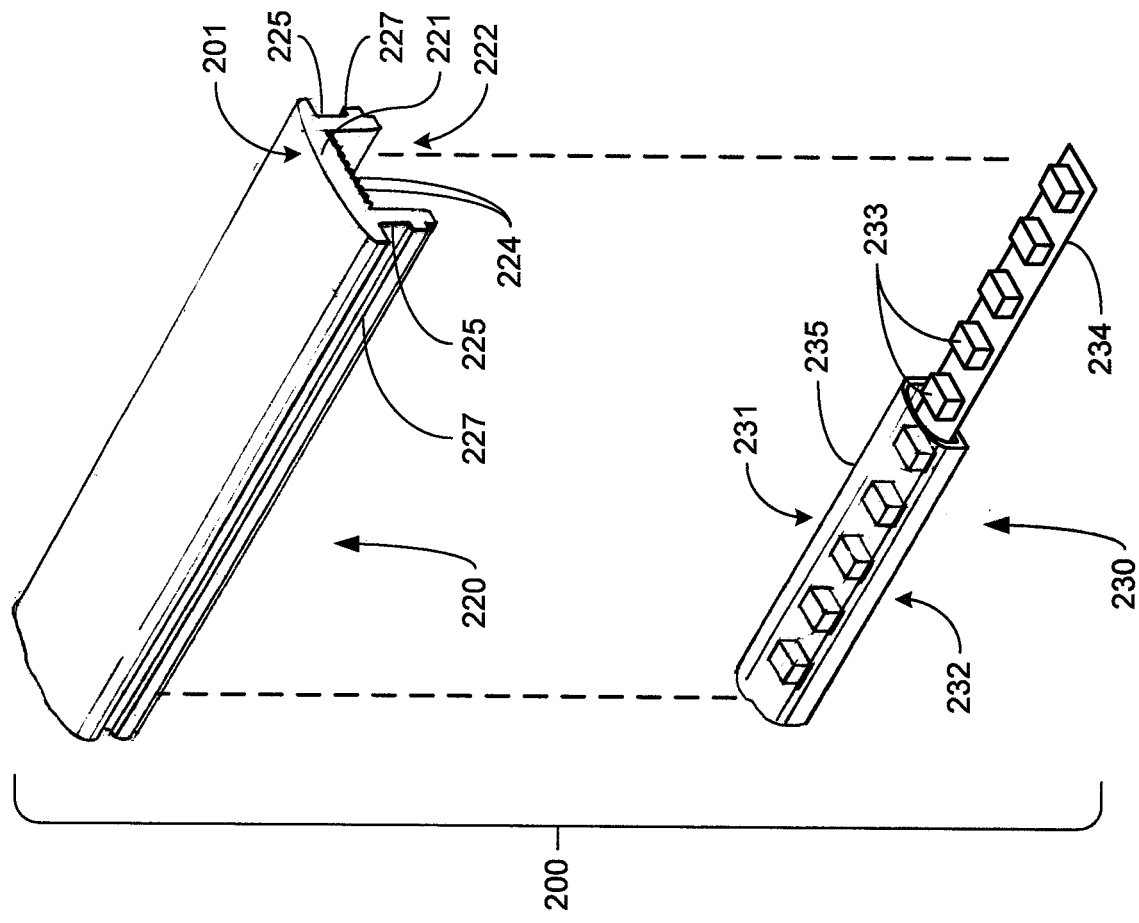
FIG. 4B is an exploded perspective view of a subset of the components of an another embodiment of the up-lighting assembly of the up-lighting floor mat of FIGS. 1A-D.

Turning more specifically to FIGS. 4A-B, as depicted, the light-emitting device 230 may include any of a variety of types of flexible LED lighting strip familiar to those skilled in the art, and incorporating a flexible substrate 234 on which conductors and LEDs 233 are deposited. As also depicted, at least the LEDs 233 of such a flexible LED lighting strip may be covered in a flexible transparent material that provides physical protection of at least the LEDs against physical impacts and exposure to moisture. More specifically, a covering may be used that is selected to meet one or more national or international standards, including and not limited to, those of the International Electrotechnical Commission (IEC), such as IEC standard 60529. More specifically, such a covering may be selected to comply with level IP67 or IP68 of the IEC standard 60529 for protection against exposure to dust and water.

In some embodiments, solid transparent material may be disposed atop and/or all around the depicted flexible LED lighting strip in sufficient quantity as to form the curved or bulbous upper surface 231, as depicted in FIG. 4A. Alternatively, the flexible LED strip may be covered in a thinner layer (e.g., a coating) of flexible transparent material that does not define such a curved or bulbous upper surface. In other embodiments, the flexible LED lighting strip may be sheathed within a close-fitting tube 235 of transparent flexible plastics material. Still other physical packaging configurations for a flexible LED lighting strip to form the light-emitting device 230 will be familiar to those skilled in the art and may be employed in keeping with the spirit and scope of what is disclosed herein.

Figure 4C:
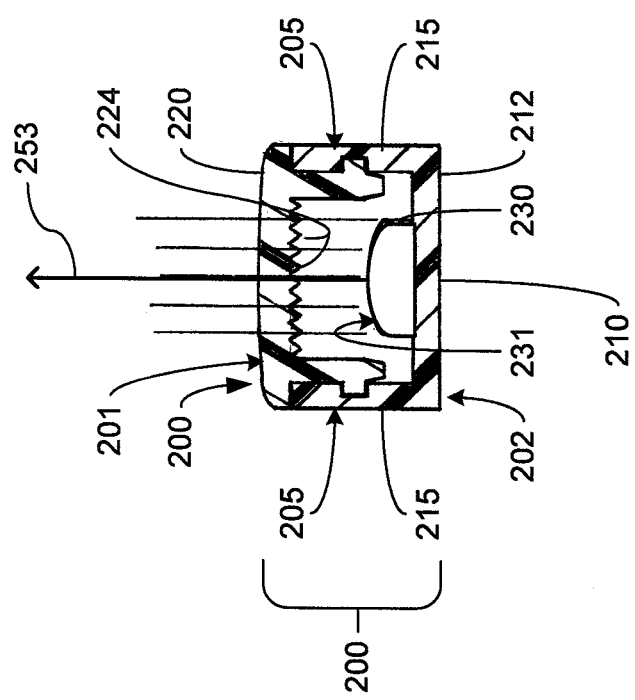
FIGS. 4C through 4F are each a cross-sectional view of a different embodiment of the up-lighting device of the up-lighting floor mat of FIGS. 1A-D that, taken together, show details of the manner in which a directional light output of the light-emitting device of thereof may be aimed at different angles.
Figure 4E:
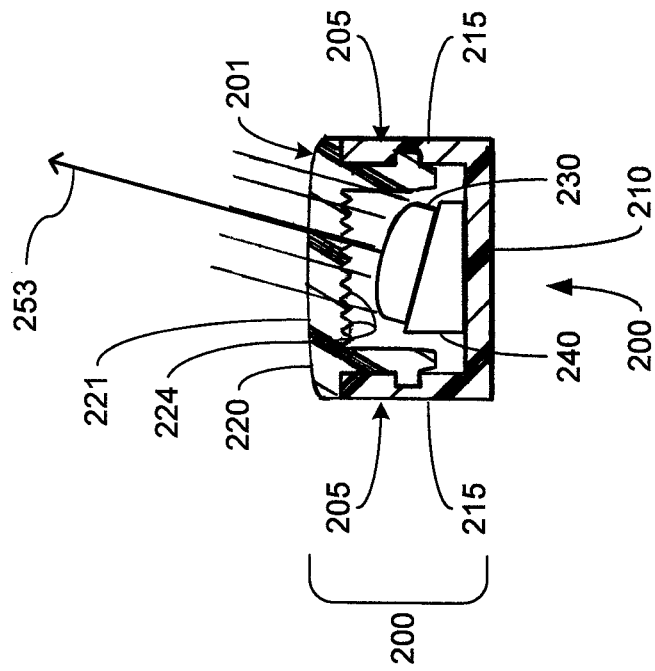
Figure 4D:
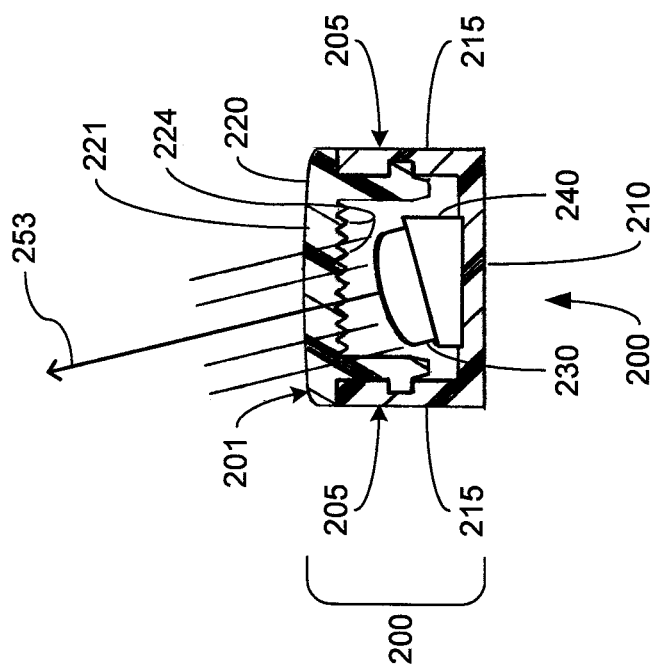

Turning more specifically to FIGS. 4C-F, in some embodiments, despite whatever protective covering features may be incorporated into the light-emitting device 230, itself, the diffuser 220 and/or the U-channel 210 may, separately or in cooperation with each other, serve to provide additional physical protection to the light-emitting device 230. In some embodiments, the horizontally-extending portion 221 of the downwardly-opening diffuser 220 may have a slight dome-shaped cross-section that gives the upwardly-facing surface 201 a slight upwardly-extending curve, as depicted in FIGS. 4C-E. Such a curved shape may cooperate with the ribbing 224 defined by the downwardly-facing surface 222 to further diffuse the light emitted from the curved or bulbous upper surface 231 of the light-emitting device 230. However, in addition to or in lieu of serving to diffuse light, such a curved shape may be employed to increase the strength of the horizontally-extending portion 221 to better resist the downward forces exerted by personnel stepping on the upwardly-facing surface 201. More generally, the diffuser 220 may serve to protectively cover the upwardly-opening U-channel 210 to prevent the entrance of dust, debris and/or liquids therein.

In some embodiments, the rigidity of the material from which the diffuser 220 is formed and the flexibility of the material from which the U-channel 210 is formed may be used in concert to provide protection to the light-emitting device 230. By way of example, as depicted, portions of the horizontally-extending portion 221 of the diffuser 220 may overlap upwardly-extending ends of the pair of upwardly-extending portions 215 of upwardly-opening U-channel 210. The rigid material of the horizontally-extending portion 221 of the diffuser 220 may cause downward pressure applied by personnel stepping on the horizontally-extending portion 221 of the diffuser to be transferred to the pair of upwardly-extending portions 215 of the upwardly-opening U-channel 210. The flexible material of the upwardly-extending portions 215 may permit the upwardly-extending portions 215 to crush to some degree to absorb some of that downward pressure. Such absorption of such downward pressure may impart some degree of downward "give" to the horizontally-extending portion 221 in response to being stepped on by personnel such that the horizontally-extending portion 221 is able to provide protection to the light-emitting device 230, while also providing some amount of cushioning to personnel standing and/or walking upon the up-lighting floor mat 1000. In this way, the sensation of stepping upon the horizontally-extending portion 221 may not be as discernibly different from stepping upon the floor matting 100, at least to personnel wearing shoes.

As is familiar to those skilled in the art, LEDs tend to emit light with a highly directional quality (i.e., in a manner somewhat akin to a spotlight), as opposed to other types of lighting devices that tend to emit light more omnidirectionally (e.g., incandescent bulbs). Thus, as is depicted more clearly in FIGS. 4C-4F, the light emitted by the lighting device 230 may have a relatively directional quality such that it may be emitted primarily in a single direction (i.e., along an axis) indicated by arrow 253. It should be noted that descriptions of light being emitted "primarily" in a particular direction are meant to be interpreted as meaning that a light emitting device (e.g., an LED of a flexible LED strip, or other form of light emitting device) is directional in its emission of light to the extent that it emits light with greatest intensity in the particular direction, and also with some degree of spread from the particular direction. As is familiar to those skilled in the art, such a spread of light emitted by a light emitting device may have a cone-like spread in a manner akin to the light emission of a spotlight where there is cone-like spread of light that is centered about a central axis along which light is emitted with greatest intensity. Therefore, it should be noted that descriptions of emitting light "primarily" in a particular direction should not be interpreted as indicating that no light is emitted in any other direction, as would be the case with the collimated light of a laser. Where the downwardly-facing mounting surface 232 of the light-emitting device 230 is directly adhered to the upwardly-facing surface 211 of the horizontally-extending portion 212 of the U-channel 210, the primary direction of emission of light, as indicated by the arrow 253 in FIG. 4B, may be vertically upward when the up-lighting floor mat 1000 is placed atop a horizontal support surface (e.g., a horizontal floor).

Figure 4F:
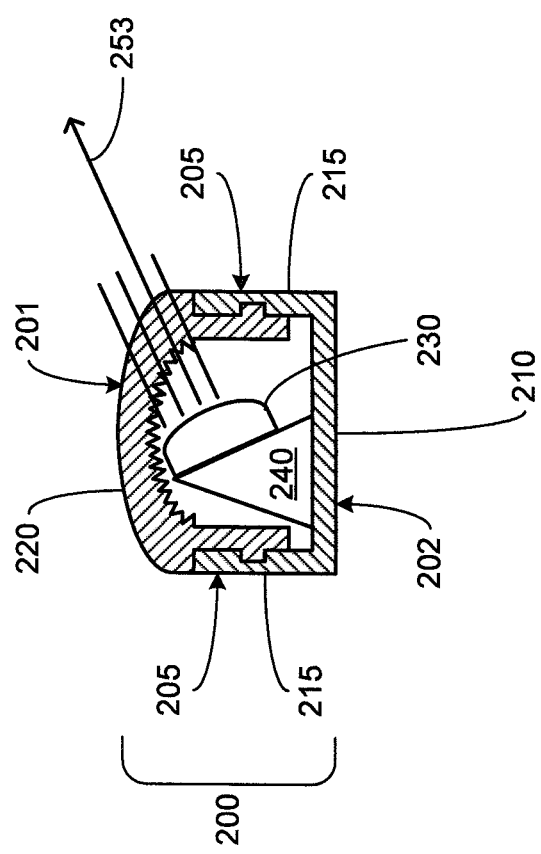

However, it may be deemed desirable to use such directionality of the light emitted by LEDs to advantage to address a need to emit such directional light from the up-lighting floor mat 1000 at an angle that is tilted away from vertical. By way of example, as is familiar to those skilled in the art, close inspection of finished surfaces, such as painted metal surfaces, is sometimes best done with light directed at an angle to that surface other than perpendicular to that surface. Thus, in some embodiments, and as is depicted in FIGS. 4D-F, an elongate strip 240 of resilient material with a wedge-shaped cross-section may be interposed between the downwardly-facing mounting surface 232 of the lighting device 230 and the upwardly-facing surface 211 of the horizontally-extending portion 212 of the U-channel 210. The shape and/or dimensions of the wedge-shaped cross-section of the strip 240 may be selected to cause a specific resulting angle of the direction of emitted light indicated by the arrow 253 away from vertical that may be relatively slight (e.g., 15 or 30 degrees), as depicted in FIGS. 4D-E.

However, in other embodiments, the shape and/or dimensions of the wedge-shaped cross-section of the strip 240 of material may be selected to impart a specific greater angle away from vertical, such as 45 degrees, or even an angle that approaches and/or achieves 90 degrees away from vertical such that the direction of the arrow 253 may extend parallel relative to the plane of at least a portion of the upwardly-facing surface 101 of the floor matting 100. It should be noted that to achieve a greater angle away from vertical, such as one that approaches or reaches 90 degrees, may additionally require alterations to the cross-section of the diffuser 220, such as a more pronounced upwardly-extending curve of the horizontally-extending portion 221, as depicted in FIG. 4F.

In some embodiments, the strip 240 of flexible material of wedge-shaped cross-section may be created from a cutting 130 generated as a result of trimming one or more mat portions 110 (e.g., one or more of the mat portions 110a-d of FIGS. 1A-D), as previously discussed. More specifically, a portion of such a cutting 130 that includes an outer edge 103 that defines a ramp may be used where the angle of such a ramp is appropriate to provide a desired angle away from vertical of the direction of emitted light indicated by the arrow 253.

Figure 5C:
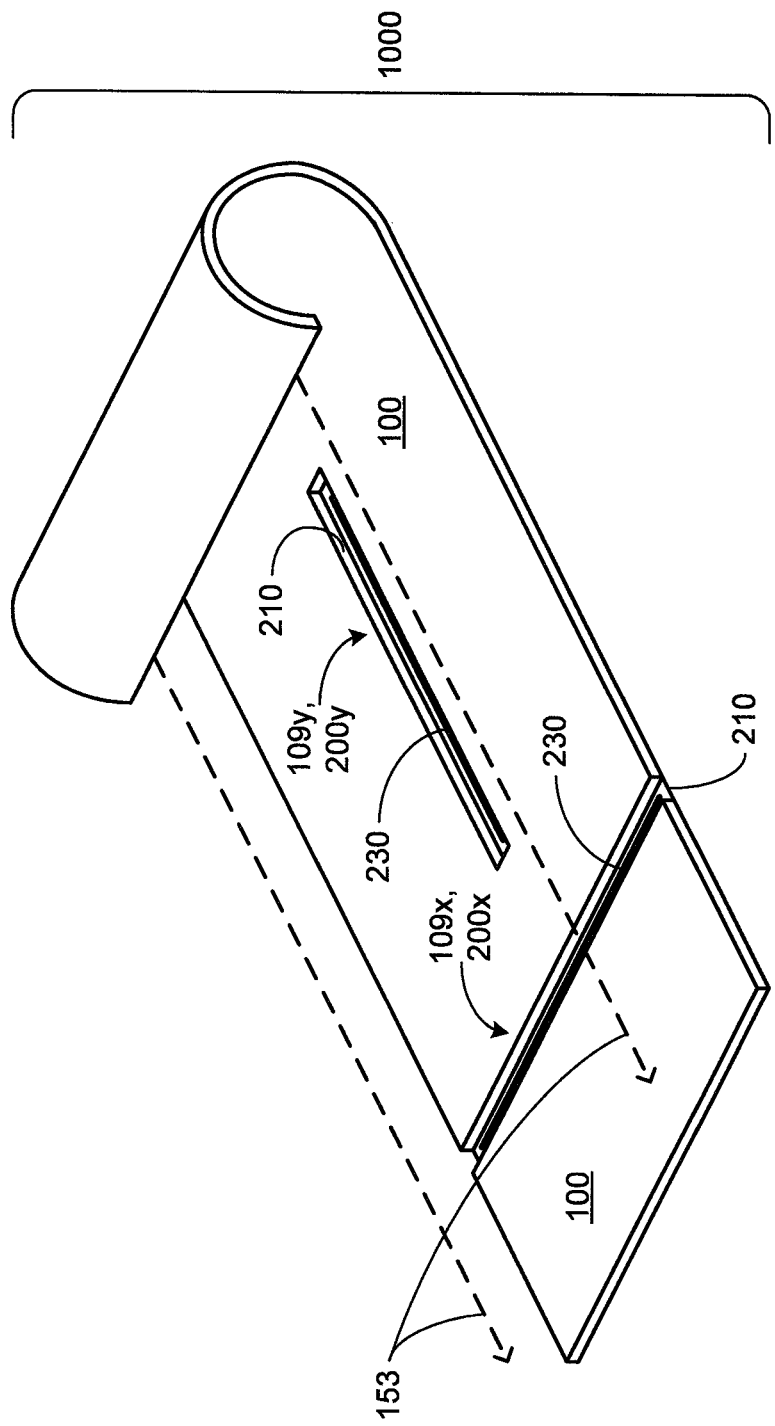
FIG. 5C is a perspective view of another embodiment of up-lighting floor mat showing details of being rolled up for transport and/or storage thereof.

Turning to FIGS. 5A through 5C, The flexible material from which the upwardly-opening U-shaped channel 210 is formed, coupled with the fact that the horizontally-extending portion 212 of the U-shaped-channel 210 may be considerably thinner than the floor matting 100, may aid in making the up-lighting floor mat 1000 considerably easier to roll up and/or easier to roll up into a tighter roll at the location of the U-shaped channel 210, as depicted in FIGS. 5A-B. Indeed, in some embodiments, the placement of multiple up-lighting assemblies 200 may be selected to, at least in part, provide regular spacing of multiple upwardly-opening U-channels 210 that may provide multiple locations at which the up-lighting floor mat 1000 may be able to be more tightly rolled up for transport.

Regardless of the quantity of upwardly-opening U-channels 210 that may be included, the outwardly-extending projections 227 carried by the downwardly-extending portions 225 of the diffuser 220, and the inwardly-opening-recesses 217 defined by the upwardly-extending portions 215 of the U-channel 210 (best seen in FIG. 3C), may be shaped and/or sized to enable relatively easy and/or tool-less insertion of the diffuser(s) 220 into the U-channel(s) 210 and relatively easy and/or tool-less removal of the diffuser(s) therefrom. More specifically, each diffuser 220 may be designed to be easily "snapped" into and out of a U-channel 210 to enable easy removal when the up-lighting floor mat 1000 is to be rolled up, and easy re-installation when the up-lighting floor mat 1000 is unrolled for use at a new location. This may be done to accommodate the forming of the diffuser(s) 220 from a rigid material that would impede rolling up of the up-lighting floor mat 1000 if the diffuser(s) are not removed from the U-channel(s) 210. The removed diffuser(s) 220 may then be transported in an elongate straight form along with the rolled-up up-lighting floor mat 1000. By way of example, an up-lighting floor mat 1000 may be rolled up around the diffuser(s) 220 that are removed therefrom such that the rolled-up up-lighting floor mat 1000 may be transported and/or stored in a manner that may prevent its diffuser(s) 220 from being misplaced.

As depicted in FIG. 5C, the orientation in which an up-lighting assembly 200 is positioned within the floor matting 100 of an up-lighting floor mat 1000 relative to the direction in which the up-lighting floor mat 1000 is to be rolled up may determine whether the removal of its diffuser 220 is necessary. More specifically, FIG. 5C depicts the U-channel 210 and light-emitting device 230 portions of an up-lighting assembly 200y as having been positioned within a slot 109y formed in the floor matting 100 in an orientation in which the elongate shape of the up-lighting assembly 200y extends in parallel with the direction in which the depicted up-lighting floor mat 1000 is to be rolled up, as indicated by arrows 153. As a result of this orientation, and due to the diffuser 220 (not shown) of the up-lighting assembly 200y being formed from rigid plastics material, as discussed above, the diffuser 220 of the up-lighting assembly 200y may need to be removed to allow such rolling up of the depicted up-lighting floor mat 1000 to occur. Due to the earlier-discussed flexibility of both the U-channel 210 and the light emitting device 230, neither of these components of the up-lighting assembly 200y that remain in place (following the removal of the diffuser 220) may provide any impediment to such rolling up of the depicted up-lighting floor mat 1000.

FIG. 5C also depicts the U-channel 210 and light-emitting device 230 portions of another up-lighting assembly 200x as having been positioned within a slot 109x formed in the floor matting 100 in an orientation in which the elongate shape of the up-lighting assembly 200x extends cross-wise to the direction in which the depicted up-lighting floor mat 1000 is to be rolled up, again, as indicated by arrows 153. As a result of this orientation, there may be no need to remove the diffuser 220 of the up-lighting assembly 200x to allow such rolling up of the depicted up-lighting floor mat 1000 to occur. However, as discussed above in regard to FIGS. 5A-B, such removal of the diffuser 220 of the up-lighting assembly 200x may enable advantage to be taken of the thinner flexible material of the U-channel 210 of the up-lighting assembly 200x to allow the depicted up-lighting floor mat 1000 to be more tightly rolled up.

FIGS. 6A through 6G depict numerous differing example embodiments of up-lighting floor mat 1000 in multiple up-lighting assemblies 200 are positioned in a wide variety of orientations. As can be appreciated from these figures, combinations of up-lighting assemblies 200 may be arranged to provide illuminated guides specifying boundaries of pathways, zones of danger, and/or various geometric shapes that may convey useful information (e.g., arrows pointing indicating a preferred direction of travel along a walkway).

As exemplified by FIGS. 6A-G, numerous alternate embodiments of the up-lighting floor mat 1000 are possible that have multiple ones of the up-lighting assemblies 200 in various arrangements providing multiple parallel strips of up-lighting, criss-crossing strips of up-lighting (e.g., one or more "X" patterns), multiple strips of up-lighting that generally follow at least a subset of the outer edges 103, etc. Still other patterns and/or combinations of strips of up-lighting may occur to those skilled in the art, and would be within the spirit and scope of what is disclosed herein.

Figure 6A:
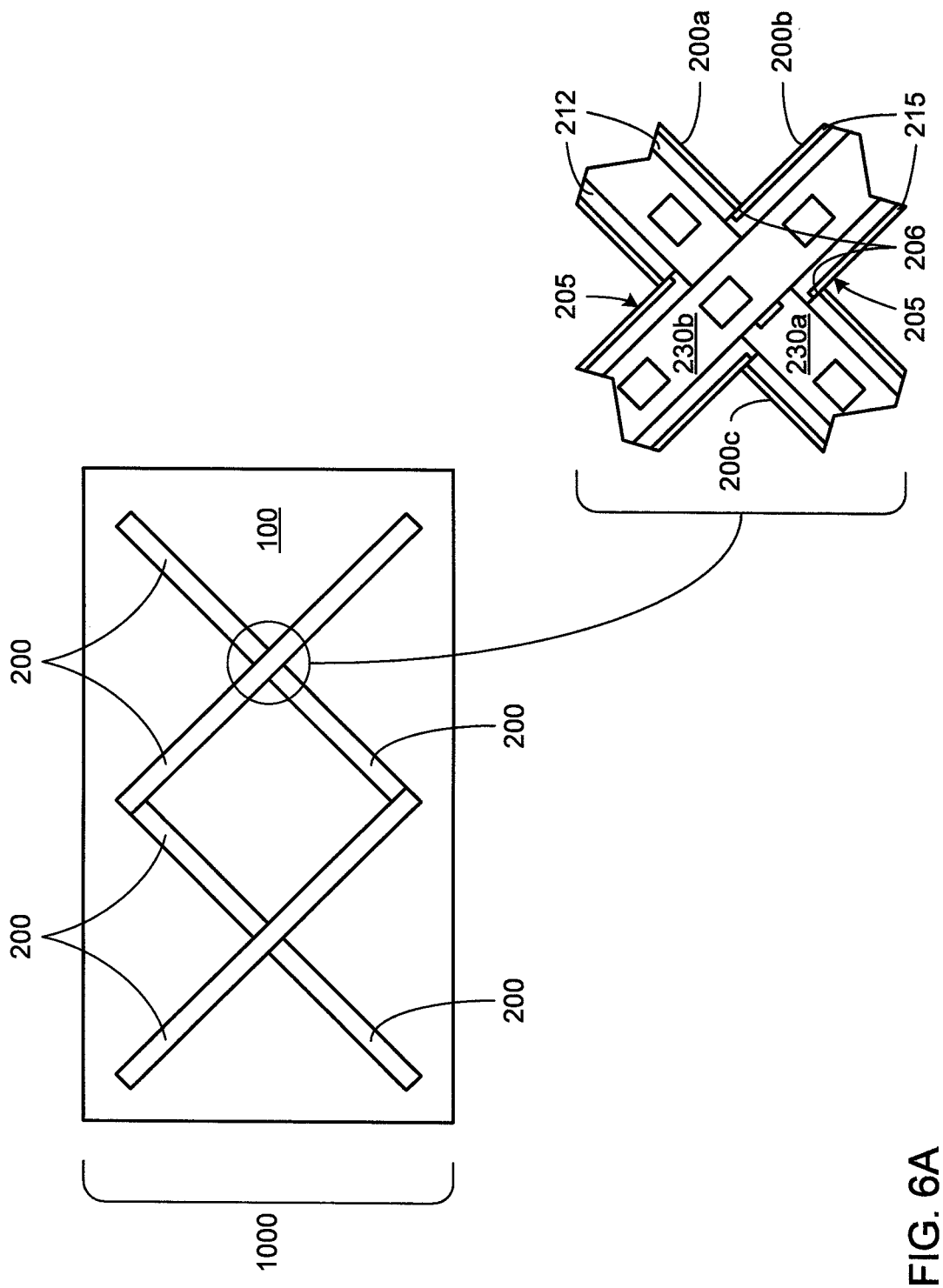
FIG. 6A is an elevational view of an alternate embodiment of up-lighting floor mat having multiple up-lighting assemblies arranged to form a pair of connected X-shapes, and showing details of four-way connection among multiple up-lighting assemblies in which a pair of light-emitting devices cross.

FIG. 6A depicts an embodiment of up-lighting floor mat 1000 in which multiple up-lighting assemblies 200 are arranged at various locations within the floor matting 100 to form a pair of connected "X" shapes. As also depicted in an inset, the center of one of the "X" shapes may be created as a pair of butt joints at which the ends 206 of two up-lighting assemblies 200a and 200c are brought up against opposed edges 205 of a third up-lighting assembly 200b. Openings may be formed through the upwardly-extending portions 215 of the U-channel 210 of the up-lighting assembly 200b at the locations of the pair of butt joints to allow a light-emitting device 230a to extend uninterrupted from an end 206 of the up-lighting assembly 200a, through the up-lighting assembly 200b in a crosswise manner, and into an end of the up-lighting assembly 200c. Additionally, the light-emitting device 230b of the up-lighting assembly 200b may be positioned to cross over the light-emitting device 230a (as depicted), or alternatively, to cross thereunder. In this way, the entirety of the center of the "X" shape may be caused to emit light.

Figure 6B:
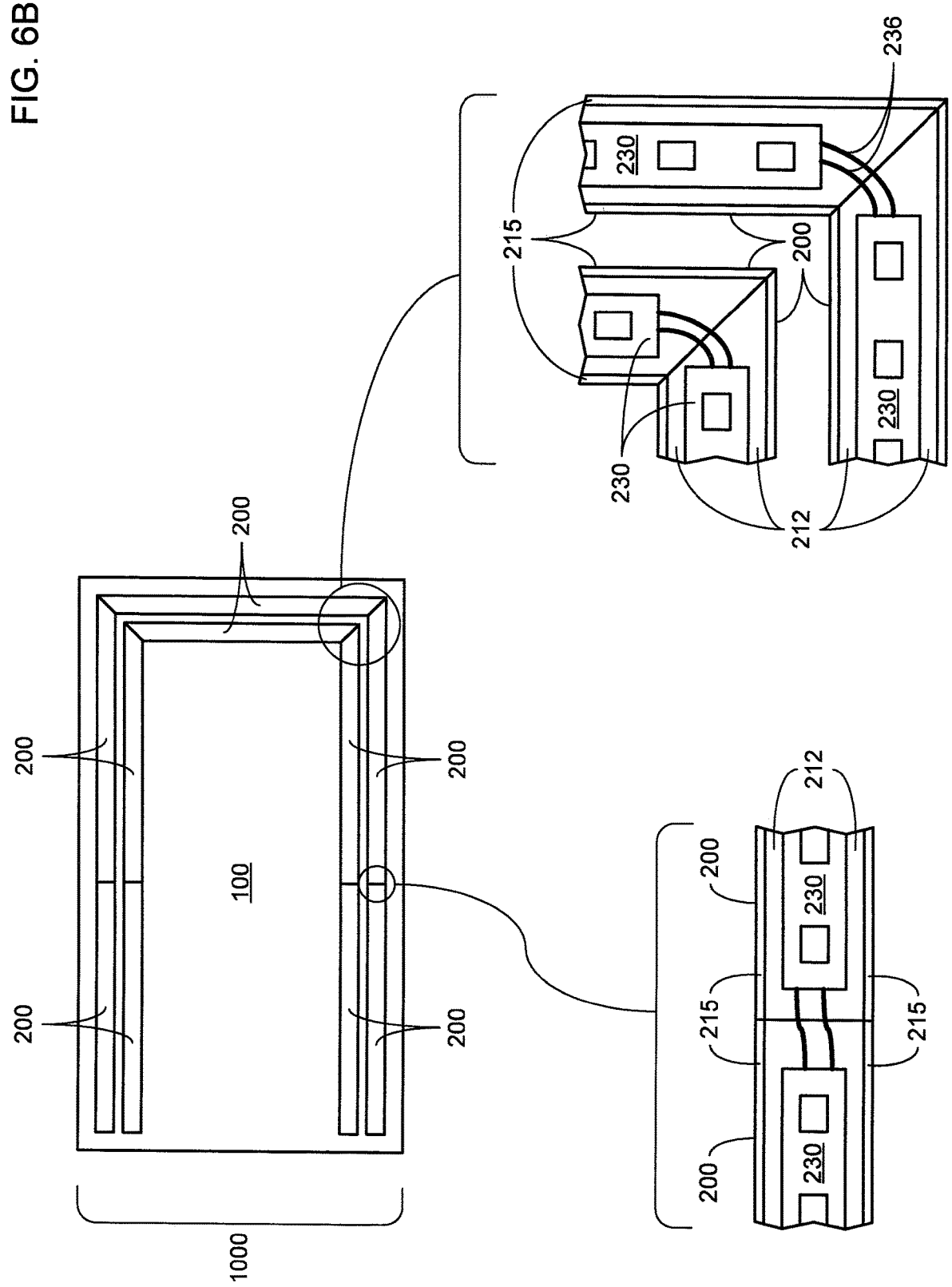
FIG. 6B is an elevational view of an alternate embodiment of up-lighting floor mat having multiple up-lighting assemblies arranged to form a pair of nested U-shapes, and showing details of various inline wired connections among multiple light-emitting devices to convey electric power thereamong.

FIG. 6B depicts an embodiment of up-lighting floor mat 1000 in which multiple up-lighting assemblies 200 are arranged at various locations within the floor matting 100 to form a pair of nested "U" shapes. As also depicted in a pair of insets, where two of the up-lighting assemblies 200 meet, either at a straight-through inline joint or at a 90 degree miter-cut joint, electrical wires 236 may be employed to convey electric power between ends of light-emitting devices 230.

Figure 6C:
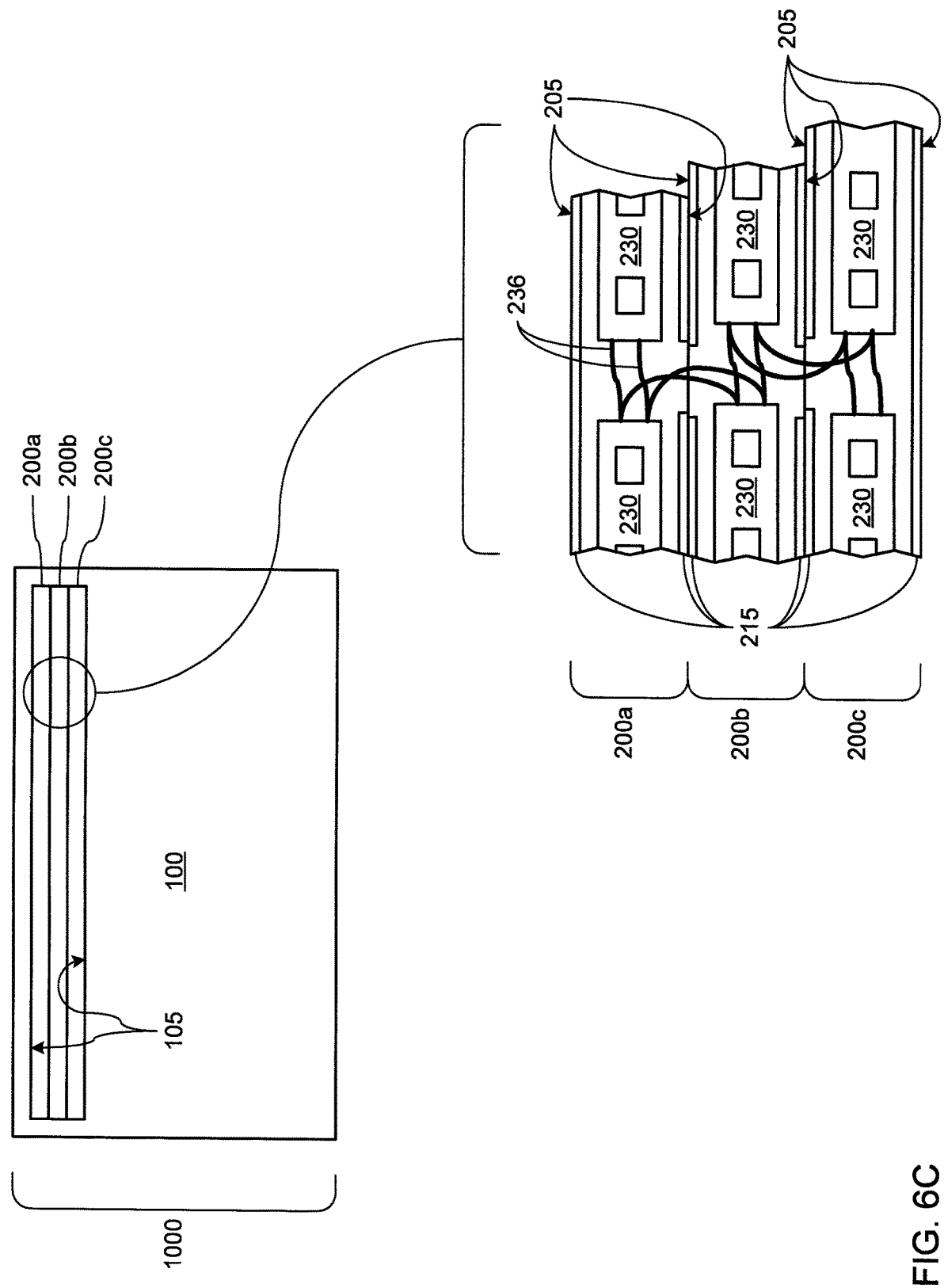
FIG. 6C is an elevational view of an alternate embodiment of up-lighting floor mat having multiple up-lighting assemblies arranged adjacent and parallel to each other, and showing details of wired connections among multiple light-emitting devices to convey electric power thereamong.

FIG. 6C depicts an embodiment of up-lighting floor mat 1000 in which a triplet of up-lighting assemblies 200a, 200b and 200c are arranged adjacent to each other and in parallel within the floor matting 100. As also depicted in an inset, to form the triplet up-lighting assemblies 200a-c, adjacent pairs of the edges 205 provided by the upwardly-extending portions 215 of the U-channels 210 of the up-lighting assemblies 200a and 200b, and of the up-lighting assemblies 200b and 200c may be directly glued together (or otherwise bonded together or affixed to each other). As a result, opposed edges 205 of the up-lighting assemblies 200a and 200c may be glued to (or otherwise bonded to or affixed to) corresponding edges 105 of the floor mating 100. Openings may be formed through adjacent pairs of the upwardly-extending portions 215 of the U-channels 210 of the up-lighting assemblies 200a and 200b, and of the U-channels 210 of the up-lighting assemblies 200b and 200c, to enable electrical wires 236 to convey electrical power among the light-emitting devices 230 within the U-channels 210 of all three of the up-lighting assemblies 200a-c.

Figure 6D:
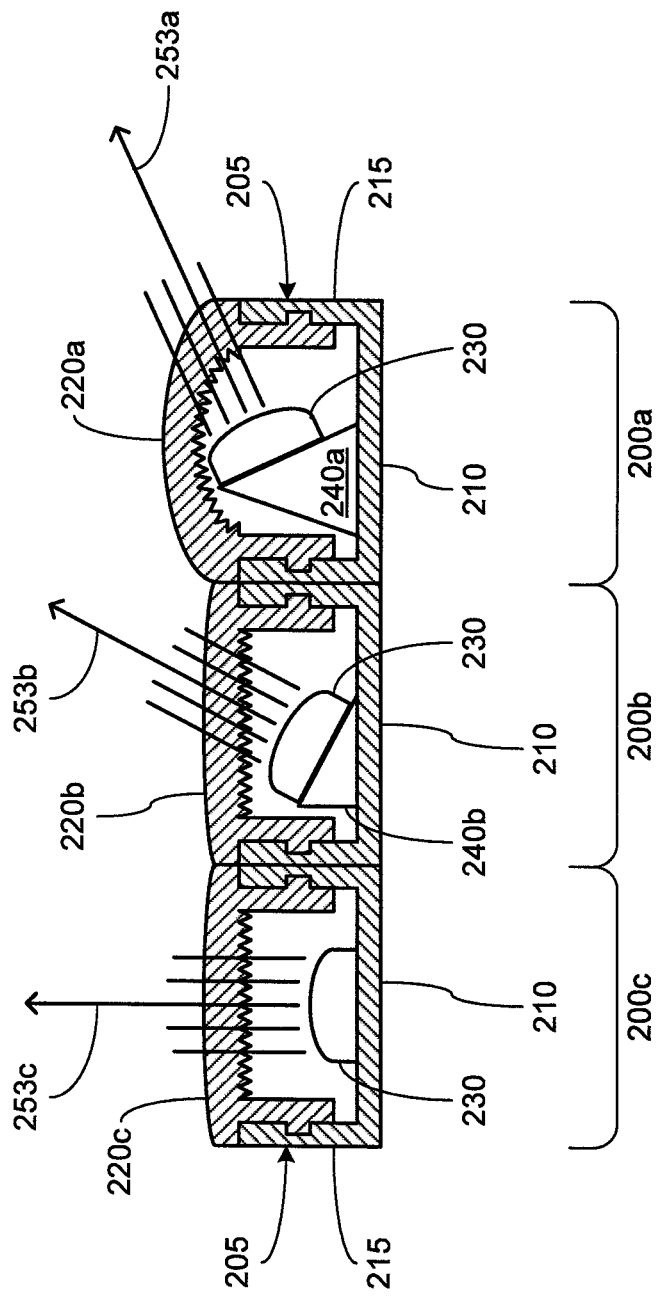
FIG. 6D is a cross-sectional view of the multiple up-lighting assemblies of the embodiment of up-lighting floor mat of FIG. 6C showing details of the selective use of different strips of resilient material and/or of different diffusers to directionally emit light at multiple different angles.

FIG. 6D provides a cross-sectional view of an embodiment of the triplet of up-lighting assemblies 200a-c of FIG. 6C. As depicted, light-emitting devices 230 positioned in the U-channels 210 of each of the up-lighting assemblies 200a-c may be positioned to achieve different angles from vertical along which light may be primarily emitted by the light-emitting devices 230. More specifically, the light-emitting device 230 of the up-lighting assembly 200c may be positioned therein in an orientation that causes the emission of light primarily in a vertical direction indicated by arrow 253c. However, strips 240a and 240b of flexible material having differing wedge-shaped cross-sections may be positioned within U-channels of the up-lighting assemblies 200a and 200b to cause their corresponding light-emitting devices 230 to each emit light primarily in a different direction angled away from vertical, as indicated by arrows 253a and 253b, respectively. Such a grouping of differing primary directions of emission of light may be employed along an outer edge 103 of such an embodiment of up-lighting floor mat 1000 to provide lighting that extends upwardly along the vertical surface of a tall wall to which objects may be affixed, or upwardly along the surfaces of a tall stack or shelf of objects.

Figure 6E:
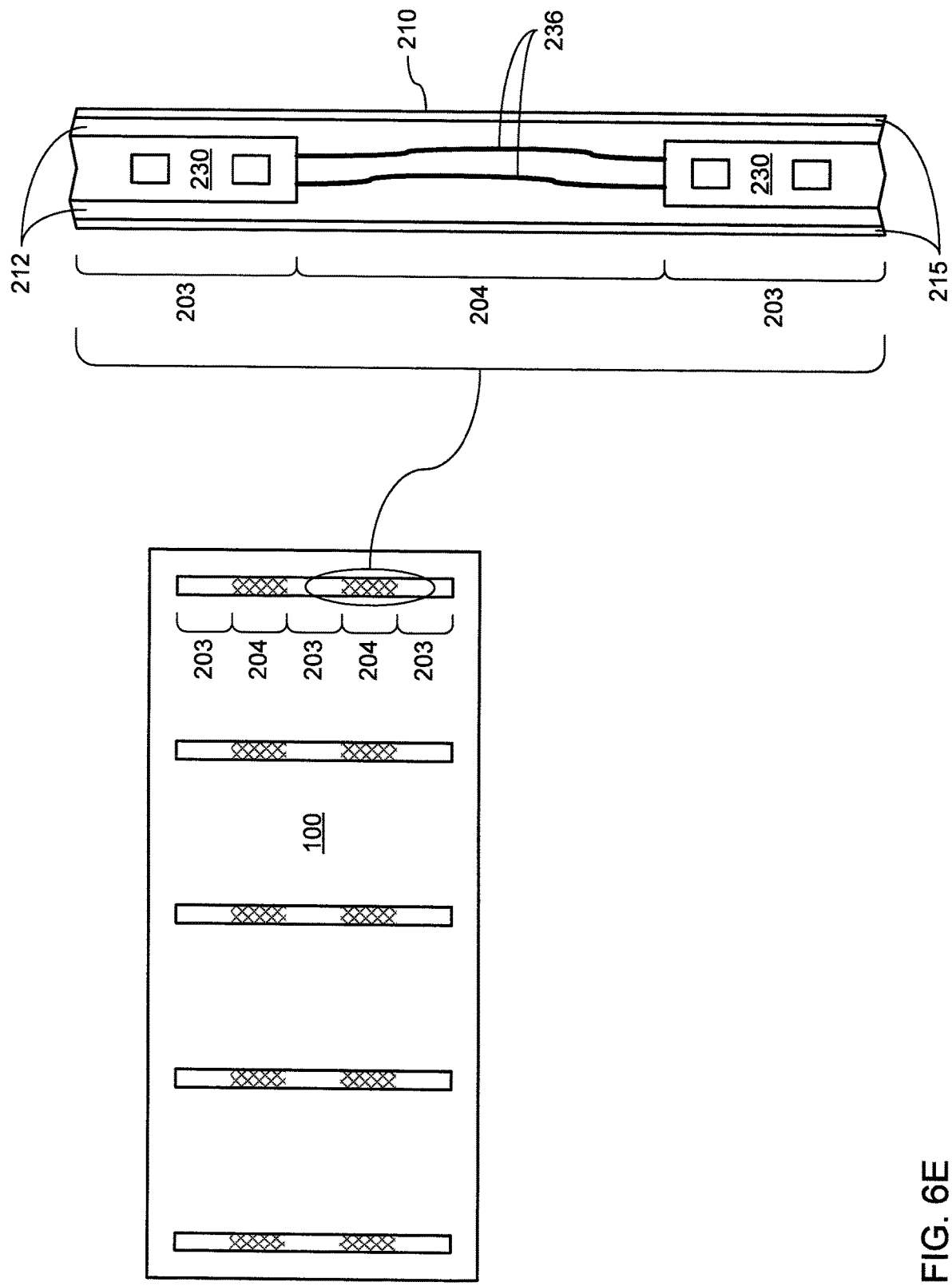
FIG. 6E is an elevational view of an alternate embodiment of up-lighting floor mat having multiple up-lighting assemblies arranged in parallel to each other, but not adjacent to each other, and showing details of wired connections among multiple light-emitting devices within each of the up-lighting assemblies to define portions thereof that emit light interspersed among portions that do not emit light to create a dashed line effect.

FIG. 6E depicts an embodiment of up-lighting floor mat 1000 in which multiple up-lighting assemblies 200 are arranged in parallel lines (though not adjacent to each other as in FIGS. 6C-D) within the floor matting 100. As also depicted in an inset, to form alternating light-emitting regions 203 and dark regions 204 along the length of each of up-lighting assemblies 200, light-emitting devices 230 may be positioned within the U-channels 210 at the light-emitting regions 203, but not at the dark regions 204. Instead, electrical wires 236 may be positioned within the U-channels 210 where at least a subset of the dark regions 204 are located to convey electric power among the light-emitting devices 230.

Such an arrangement of up-lighting assemblies 200 with such alternating between light-emitting regions 203 and dark regions 204 may be used where it is deemed desirable to spread out the emission of light across more of the top surface 101 of an up-lighting floor mat 1000, but where it is also deemed desirable to limit the amount of light emitted such that the use of light-emitting devices 230 extending the full length of each of the up-light assemblies 200 would result in the output of too much light. Alternatively, the generation of the "dashed line" pattern that results from such alternating light-emitting regions 203 and dark regions 204 may be deemed useful where a lengthy run of up-lighting assemblies 200 is used to create a kind of visual divider marking based on such dashed lines, such as a divider that may define adjacent lanes of traffic along the length of a walkway in a manner akin to road markings.

Figure 6F:
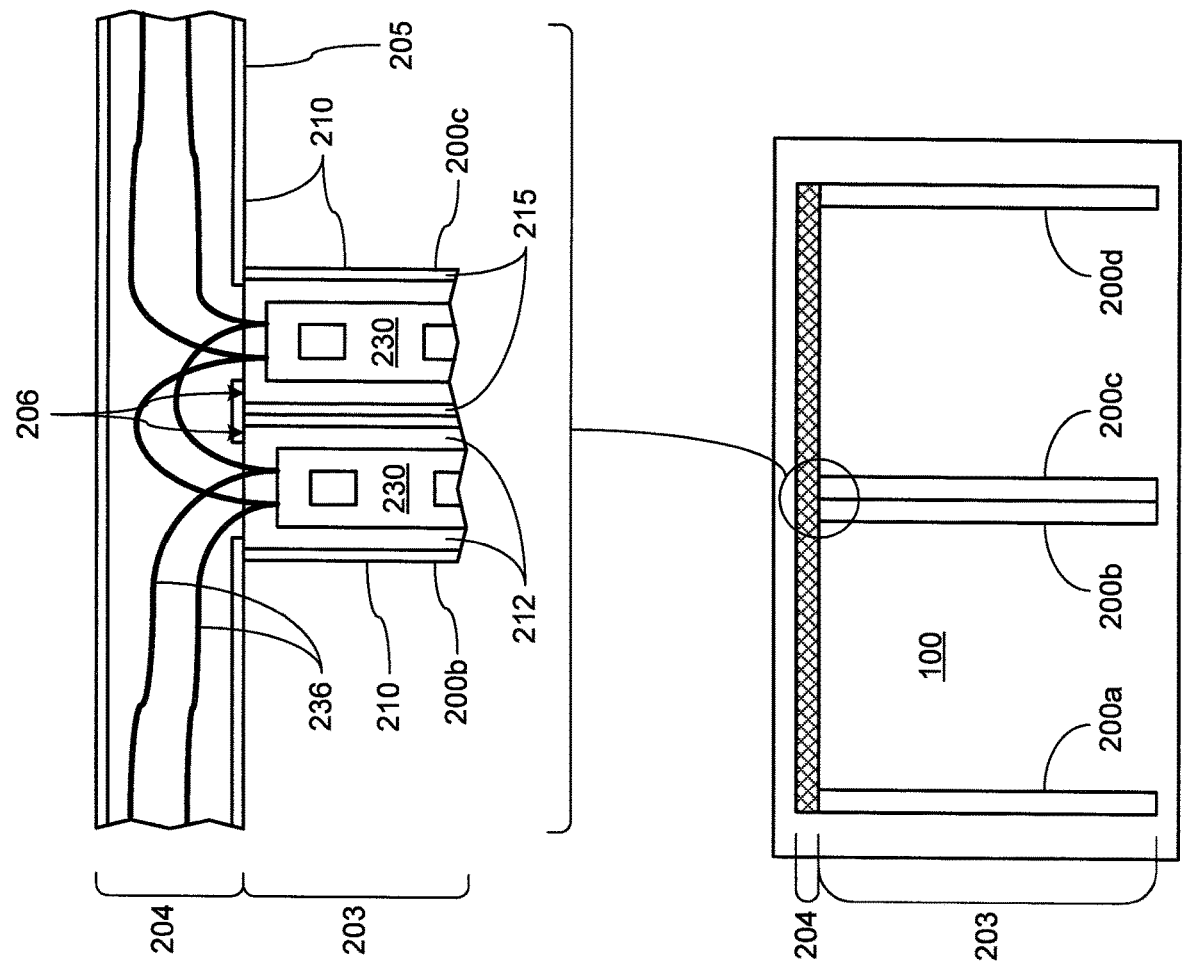
FIG. 6F is an elevational view of an alternate embodiment of up-lighting floor mat having multiple up-lighting assemblies arranged in parallel to each other and connected to an intersecting U-channel covered by a diffuser from which light is not emitted, and showing details of wired connections among multiple light-emitting devices within each of the up-lighting assemblies.

FIG. 6F depicts an embodiment of up-lighting floor mat 1000 in which multiple up-lighting assemblies 200a through 200d that each define a light-emitting region 203 are arranged in parallel lines (at least some of which may be arranged in adjacent pairs of parallel lines) that are interconnected by a perpendicularly-extending combination of U-channel 210 and diffuser 220 that define a dark region 204. As also depicted in an inset, such a perpendicularly extending combination of U-channel 210 and diffuser 220 may meet ends 206 of each of the parallel-extending up-lighting assemblies 200 at a butt joint through which electrical wires 236 may extend to convey electrical power to the light-emitting devices 230 within the parallel-extending up-lighting assemblies 200.

FIG. 6G provides an edge-on elevational view of the up-lighting floor mat 1000 of FIG. 6F. As depicted, a non-adjacent pair of up-lighting assemblies 200a and 200b may be configured using strips 240 of resilient material (as has been previously described) to cause light-emitting devices 230 thereof to emit light primarily in directions indicated by arrows 253a and 253b, respectively, that are selected to effect triangulation of such emitted light onto a portion of a downwardly facing surface 909 of an object 900 suspended over a floor 999. Similarly, another non-adjacent pair of up-lighting assemblies 200c and 200d may be similarly configured to cause light-emitting devices 230 thereof to emit light primarily in directions indicated by arrows 253c and 253d, respectively, that are selected to effect triangulation of such emitted light onto another portion of the downwardly facing surface 909 of the object 900. As previously discussed, such angling of light that shines onto a surface may advantageously illuminate a surface in a manner that enables more effective inspection. Additionally, such triangulation of light from differing directions from multiple up-lighting assemblies 200 may be deemed useful in reducing shadows that would otherwise be caused through the use of light emitting primarily only from one direction.

Figure 7A:
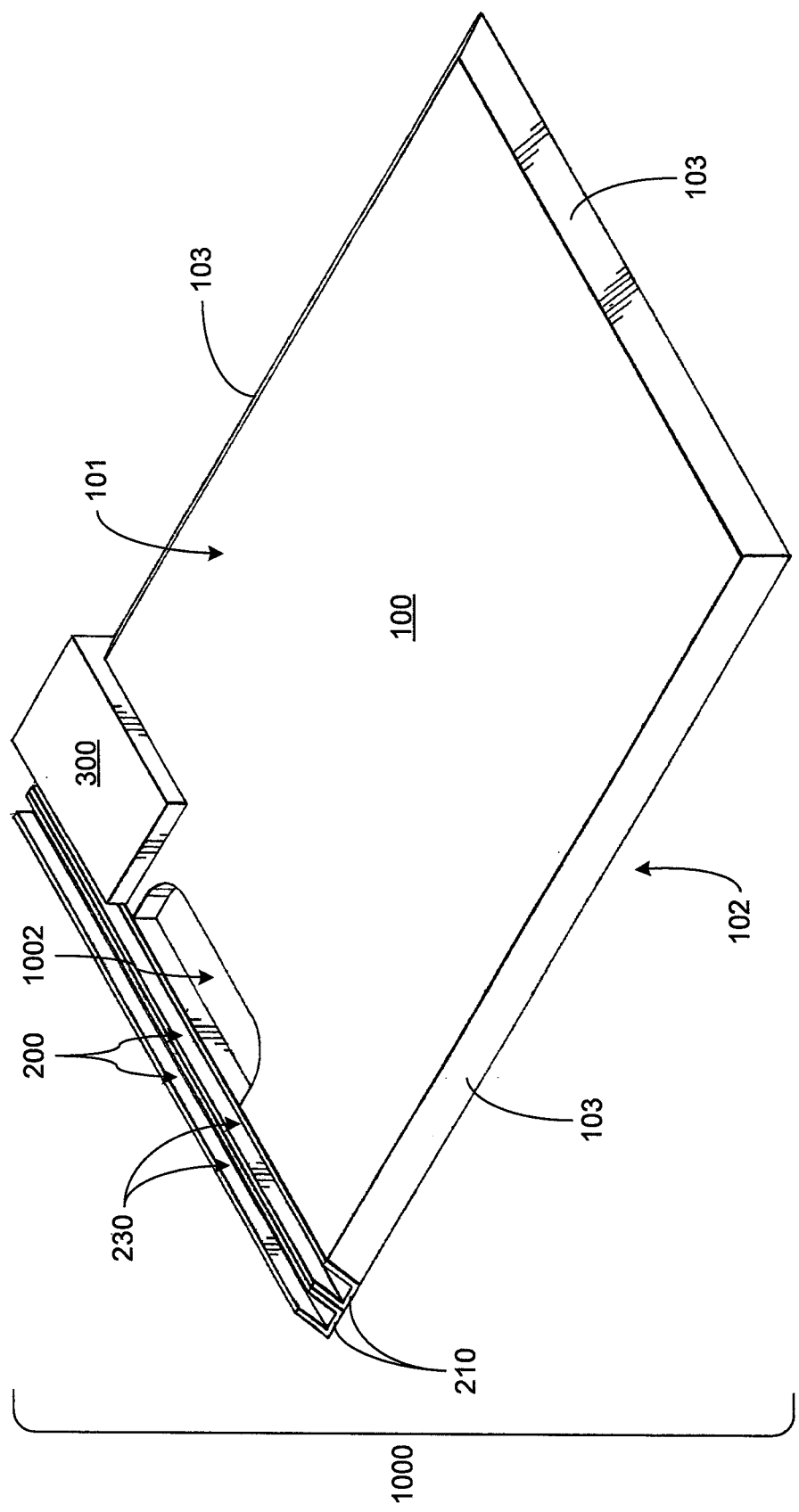
FIG. 7A is a perspective view of an example embodiment of a hand-carryable and rechargeable up-lighting floor mat.
Figure 7B:
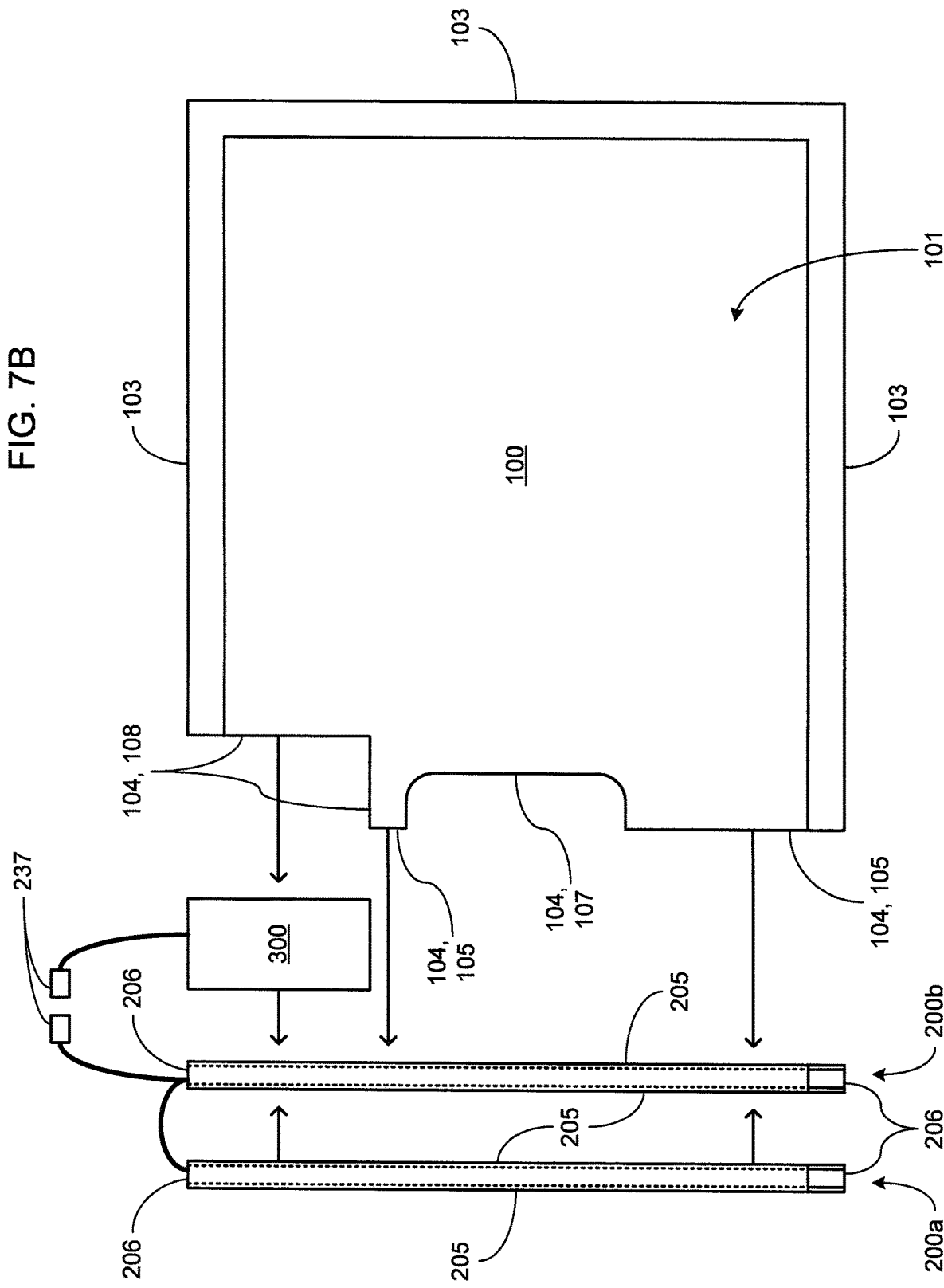
FIG. 7B is an exploded perspective view of the portable up-lighting floor mat of FIG. 7A showing details of the assembly thereof.

FIGS. 7A and 7B, taken together, depict various aspects of a hand-carryable embodiment of up-lighting floor mat 1000, which may include floor matting 100, a pair of up-lighting assemblies 200a and 200b, and/or a power source 300 integrated therein. As best appreciated by viewing FIG. 7A, the up-lighting floor mat 1000 may have a generally rectangular shape with the pair of up-lighting assemblies 200a-b and the power source 300 adhered to (or otherwise bonded to or affixed to) the floor matting 100 along one edge thereof in a manner that defines an opening 1002 that enables the pair of up-lighting assemblies 200 to be used as a handle by which the up-lighting floor mat 1000 may be carried with one hand.

Turning more specifically to FIG. 7B, the floor matting 100 may be formed from a single rectangular floor mat that may be trimmed along one edge thereof to form a set of cut edges 104. Among the set of cut edges 104 may be an adjacent pair of the cut edges 104 that define a pair of inset edges 108 that define an inset corner of the floor matting 100 that is shaped and sized to receive the power source 300. In so receiving the power source 300, portions of the casing of the power source 300 may be glued to (or otherwise adhered or bonded to) each of the inset edges 108.

Another pair of the cut edges 104 may define a pair of edges 105 to which portions of an edge of up-lighting assembly 200b is to be glued (or otherwise adhered or bonded). The same edge 205 of the up-lighting assembly 200b may also be directly glued (or otherwise adhered or bonded) to a portion of the casing of the power source 300 such that the power source 300 is interposed between a portion of the up-lighting assembly 200b and a portion of the floor matting 100. The opposing edge 205 of the up-lighting assembly 200b may be directly glued (or otherwise adhered or bonded) to an edge 205 of the up-lighting assembly 200a such that the pair up-lighting assemblies 200a and 200b are caused to extend parallel to and adjacent to each other.

The pair of cut edges 104 that define the pair of edges 105 may flank a curving cut edge 104 that defines an unattached edge 107 (as depicted), or a subset of cut edges 104 that define a set of unattached edges 107, that may cooperate with the up-lighting assembly 200b to define the opening 1002 through which at least the digits of a hand may extend to wrap around and grasp the pair of up-lighting assemblies 200a-b in a manner that results in the pair of up-lighting assemblies 200a-b being used as a carry handle. Although the U-channels 210 of the pair of up-lighting assemblies 200a-b may be made of flexible material, the rigid material of the diffusers 220 of the pair of up-lighting assemblies 200a-b may be used to impart rigidity to the structure of the handle that is provided by the pair of up-lighting assemblies 200a-b. Indeed, in some embodiments, the diffusers 220 may be permanently affixed to corresponding U-channels 210 of the pair of up-lighting assemblies 200a-b. As a result, a person who carries this embodiment of the up-lighting floor mat 1000 by using the pair of up-lighting assemblies 200a-b in this way need not contend with the corners near the ends 206 flexing in such a manner that may make carrying this embodiment of the up-lighting floor mat 1000 more difficult.

As further depicted, the power source 300 may be connectable to the pair of up-lighting assemblies 200a-b via electric cables that may include electrical connectors 237. Through use of the electrical connectors 237, the power source 300 may be electrically connected to the pair of up-lighting assemblies 200a-b to convey electric power thereto from the power source 300. Alternatively, through use of the electrical connectors 237, the power source may alternatively or additionally be connected to an external source of electric power by which the power source 300 may be recharged in embodiments in which the power source 300 is a rechargeable battery or other form of electric power storage device.

Although the invention has been described in a preferred form with a certain degree of particularity, it is understood that the present disclosure of the preferred form has been made only by way of example, and that numerous changes in the details of construction and the manner of manufacture may be resorted to without departing from the spirit and scope of the invention. It is intended to protect whatever features of patentable novelty exist in the invention disclosed.

The invention claimed is:

1. An up-lighting floor mat comprising:
floor matting that defines an upwardly-facing surface and an opposed downwardly-facing surface when supported atop an upwardly-facing support surface, and that is formed from a first flexible material that enables the up-lighting floor mat to be rolled up for transport or storage; and
a first elongate up-lighting assembly positioned within a first elongate slot defined through the floor matting to emit light upwardly from the first elongate slot, wherein the first elongate up-lighting assembly comprises:
a first U-channel of elongate shape and upwardly-opening cross-section defined by a pair of upwardly-extending portions connected by a horizontally-extending bottom portion, wherein:
at least one of the upwardly-extending portions of the first U-channel is bonded to at least one edge of the floor matting that defines the first elongate slot;
the horizontally-extending bottom portion of the first U-channel defines a portion of the downwardly-facing surface; and the first U-channel is formed from a second flexible material that cooperates with the first flexible material of the floor matting to enable the up-lighting floor mat to be rolled up;

a first LED strip positioned within the first U-channel, wherein the first LED strip is sufficiently flexible as to not impede the rolling up of the up-lighting floor mat; and a first diffuser of elongate shape and downwardly-opening U-shaped cross-section defined by a pair of downwardly-extending portions connected by a horizontally-extending top portion, wherein:

the first diffuser is installable over the upwardly-facing opening of the first U-channel, with the downwardly-facing opening of the first diffuser opening into the first U-channel, and with each of the downwardly-extending portions of the first diffuser extending alongside and adjacent to a corresponding one of the upwardly-extending portions of the first U-channel to form a tube around the first LED strip;

the first diffuser is removable from installation over the upwardly-facing opening of the first U-channel to avoid impeding the rolling up of the up-lighting floor mat;

the first diffuser is formed from rigid transparent or translucent material to enable light emitted by LEDs of the first LED strip to pass therethrough; and each of a pair of outwardly-extending portions of the horizontally-extending top portion of the first diffuser extend over an uppermost end of one of the upwardly-extending portions of the first U-channel to transfer downward pressure exerted on the horizontally-extending top portion of the first diffuser into the pair of upwardly-extending portions of the first U-channel and around the first LED strip to protect the first LED strip from the downward pressure.

2. The up-lighting floor mat of claim 1, wherein the first LED strip is attached to an upwardly facing surface of the horizontally-extending bottom portion of the first U-channel.

3. The up-lighting floor mat of claim 1, further comprising:
an electric power source; and
an electric cable to convey electric power from the power source to the first elongate up-lighting assembly to enable the first elongate up-lighting assembly to emit light upwardly from the first elongate slot, wherein:
an end of the first elongate slot opens through an edge of the floor matting;
an end of the first elongate up-lighting assembly extends to the open end of the first elongate slot; and
the electric cable extends from the power source and to the end of the first elongate up-lighting assembly that extends to the open end of the first elongate slot.

4. The up-lighting floor mat of claim 3, wherein:
the floor matting is trimmed to form an inset corner defined by at least two adjacent inset edges; and
the power source is bonded to the floor matting at each of the at least two inset edges to integrate the power source with the up-lighting floor mat such that the power source forms part of the upwardly-facing surface and part of the opposed downwardly facing surface.

5. The up-lighting floor mat of claim 4, wherein:
the inset corner is formed adjacent to the open end of the first elongate slot; and
the power source is bonded to the first elongate up-lighting assembly at the end of the first elongate up-lighting assembly that extends to the open end of the first elongate slot such that the power source is interposed between a portion of the floor matting and the first elongate up-lighting assembly.

6. The up-lighting floor mat of claim 1, further comprising a second elongate up-lighting assembly positioned within a second elongate slot formed through the floor matting to emit light upwardly from the second elongate slot, wherein edges defined by the second elongate up-lighting assembly are bonded to edges of the floor matting that define the second elongate slot.

7. The up-lighting floor mat of claim 6, wherein a first end of the first elongate up-lighting assembly is joined to a second end of the second elongate up-lighting assembly either straight on or at an angle.

8. The up-lighting floor mat of claim 6, wherein an end of the first elongate up-lighting assembly is joined to the second elongate up-lighting assembly in a butt joint at a location along an elongate edge of the second elongate up-lighting assembly.

9. The up-lighting floor mat of claim 1, further comprising a second elongate up-lighting assembly positioned adjacent to the first elongate up-lighting assembly within the first elongate slot, wherein the second elongate up-lighting assembly comprises:

a second U-channel of elongate shape and upwardly-opening cross-section defined by a pair of upwardly-extending portions connected by a horizontally-extending bottom portion, wherein:

one of the upwardly-extending portions of the second U-channel is bonded to at least one other edge of the floor matting that defines the first elongate slot;

another of the upwardly-extending portions of the second U-channel is bonded to another of the upwardly-extending portions of the first U-channel;

the horizontally-extending bottom portion of the second U-channel defines a portion of the downwardly-facing surface; and the second U-channel is formed from the second flexible material that cooperates with the first flexible material of the floor matting to enable the up-lighting floor mat to be rolled up;

a second LED strip positioned within the second U-channel, wherein the second LED strip is sufficiently flexible as to not impede the rolling up of the up-lighting floor mat; and a second diffuser of elongate shape and downwardly-opening U-shaped cross-section defined by a pair of downwardly-extending portions connected by a horizontally-extending top portion, wherein:

the second diffuser is installable over the upwardly-facing opening of the second U-channel, with the downwardly-facing opening of the second diffuser opening into the second U-channel, and with each of the downwardly-extending portions of the second diffuser extending alongside and adjacent to one of the upwardly-extending portions of the second U-channel to form a tube around the second LED strip;

the second diffuser is removable from installation over the upwardly-facing opening of the second U-channel to avoid impeding the rolling up of the up-lighting floor mat;

the second diffuser is formed from rigid transparent or translucent material to enable light emitted by LEDs of the second LED strip to pass therethrough;

each of a pair of outwardly-extending portions of the horizontally-extending top portion of the second diffuser extend over an uppermost end of one of the upwardly-extending portions of the second U-channel to transfer downward pressure exerted on the horizontally-extending top portion of the second diffuser into the pair of upwardly-extending portions of the second U-channel and around the second LED strip to protect the second LED strip from the downward pressure; and one of the pair of outwardly-extending portions of the horizontally-extending top portion of the second diffuser abuts one of the pair of outwardly-extending portions of the horizontally-extending portion of the first diffuser.

10. An up-lighting floor mat comprising:

floor matting formed from multiple mat portions by trimming at least one mat portion of the multiple mat portions, wherein:
the at least one mat portion comprises a first flexible material that enables the up-lighting floor mat to be rolled up for transport or storage;
the floor matting defines an upwardly-facing surface and an opposed downwardly-facing surface when supported atop an upwardly-facing support surface; and
the floor matting defines a first elongate slot through the floor matting to receive a first elongate up-lighting assembly to emit light up from the first elongate slot;

a first U-channel of elongate shape and upwardly-opening cross-section that defines an elongate edge of the first elongate up-lighting assembly, wherein:
at least one upwardly-extending portion of the first U-channel is bonded to at least one edge of the floor matting that defines the first elongate slot;
a horizontally-extending bottom portion of the first U-channel defines a portion of the downwardly-facing surface; and
the first U-channel comprises a second flexible material that cooperates with the first flexible material of the floor matting to enable the up-lighting floor mat to be rolled up;

at least one elongate cutting that is also formed by trimming the at least one mat portion, wherein:
a surface of the elongate cutting is bonded to an upwardly facing surface of the horizontally-extending bottom portion of the first U-channel; and
the elongate cutting has a wedge-shaped cross-section; and a first flexible LED strip that is sufficiently flexible as to not impede the rolling up of the up-lighting floor mat, wherein a mounting surface of the first flexible LED strip is bonded to another surface of the elongate cutting to orient the first flexible LED strip within the first U-channel to cause LEDs of the first flexible LED strip to emit light primarily in a first direction that is angled away from vertical; and a first diffuser of elongate shape and downwardly-opening cross-section, wherein:
the first diffuser is installable over the upwardly-facing opening of the first U-channel to form a portion of the first elongate up-lighting assembly, with the downwardly-facing opening of the first diffuser opening into the first U-channel;

at least one downwardly-extending portion of the first diffuser extends alongside and adjacent to the at least one upwardly-extending portion of the first U-channel to form at least a portion of a tube around the first flexible LED strip;

the first diffuser comprises a rigid transparent or translucent material to enable light emitted by the LEDs of the first flexible LED strip to pass therethrough; and at least one outwardly-extending portion of a horizontally-extending top portion of the first diffuser extends over an uppermost end of the at least one upwardly-extending portion of the first U-channel to transfer downward pressure exerted on the horizontally-extending top portion of the first diffuser into the at least one upwardly-extending portion of the first U-channel and around the first flexible LED strip to protect the first flexible LED strip from the downward pressure.

11. The up-lighting floor mat of claim 10, wherein:
the at least one mat portion comprises a first mat portion and a second mat portion;
the at least one upwardly-extending portion of the first U-channel comprises a first upwardly-extending portion and a second upwardly-extending portion;
the first upwardly-extending portion and the second upwardly-extending portion are connected by the horizontally-extending bottom portion of the first U-channel;
the at least one edge of the floor matting to which the at least one upwardly-extending portion of the first U-channel is bonded comprises a first edge and a second edge of the floor matting that defines the first elongate slot;
the first upwardly-extending portion of the first U-channel is bonded to the first edge of the floor matting;
the first edge of the floor matting is formed by trimming the first mat portion to form the at least one elongate cutting;
the second upwardly-extending portion of the first U-channel is bonded to the second edge of the floor matting; and
the second edge of the floor matting is formed by trimming the second mat portion.

12. The up-lighting floor mat of claim 10, wherein:
a second elongate slot through the floor matting to receive a second elongate up-lighting assembly to emit light up from the second elongate slot is formed by trimming at least one mat portion of the multiple mat portions;
a second U-channel of elongate shape and upwardly-opening cross section defines an elongate edge of the second elongate up-lighting assembly, wherein
at least one upwardly-extending portion of the second U-channel is bonded to at least one edge of the floor matting that defines the second elongate slot;
a horizontally-extending bottom portion of the second U-channel defines a portion of the downwardly-facing surface; and
the second U-channel comprises the second flexible material;
a second flexible LED strip that is sufficiently flexible as to not impede the rolling up of the up-lighting floor mat is positioned within the second U-channel, wherein the second flexible LED strip is electrically connected to the first flexible LED strip to cause electric power to be conveyed from the first flexible LED strip to the second flexible LED strip; and a second diffuser of elongate shape and downwardly-opening cross-section is installable over the upwardly-facing opening of the second U-channel to form a portion of the second elongate up-lighting assembly; wherein:
 the downwardly-facing opening of the second diffuser opens into the second U-channel;
 at least one downwardly-extending portion of the second diffuser extends alongside and adjacent to the at least one upwardly-extending portion of the second U-channel to form at least a portion of a tube around the second flexible LED strip;
 the second diffuser comprises a rigid transparent or translucent material to enable light emitted by the LEDs of the second flexible LED strip to pass therethrough; and
 at least one outwardly-extending portion of a horizontally-extending top portion of the second diffuser extends over an uppermost end of the at least one upwardly-extending portion of the second U-channel to transfer downward pressure exerted on the horizontally-extending top portion of the second diffuser into the at least one upwardly-extending portion of the second U-channel and around the second flexible LED strip to protect the second flexible LED strip from the downward pressure.

13. The up-lighting floor mat of claim 10, wherein:
 a second U-channel of elongate shape and upwardly-opening cross-section defines an elongate edge of a second elongate up-lighting assembly, wherein
  at least one upwardly-extending portion of the second U-channel is bonded to another edge of the floor matting that defines the first elongate slot;
  a horizontally-extending bottom portion of the second U-channel defines a portion of the downwardly-facing surface; and
  the second U-channel comprises the second flexible material;
 another upwardly-extending portion of the first U-channel is bonded to another upwardly-extending portion of the second U-channel;
 a second flexible LED strip that is sufficiently flexible as to not impede the rolling up of the up-lighting floor mat is positioned within the second U-channel, wherein:
  the second flexible LED strip is electrically connected to the first flexible LED strip; and
  the second flexible LED strip is oriented within the second U-channel to cause LEDs of the second flexible LED strip to emit light primarily in a second direction different from and not in parallel with the first direction; and
 a second diffuser of elongate shape and downwardly-opening cross-section is installable over the upwardly-facing opening of the second U-channel to form a portion of the second elongate up-lighting assembly; wherein:
  the downwardly-facing opening of the second diffuser opens into the second U-channel;
  at least one downwardly-extending portion of the second diffuser extends alongside and adjacent to the at least one upwardly-extending portion of the second U-channel to form at least a portion of a tube around the second flexible LED strip;
  the second diffuser comprises a rigid transparent or translucent material to enable light emitted by the LEDs of the second flexible LED strip to pass therethrough; and
  at least one outwardly-extending portion of a horizontally-extending top portion of the second diffuser extends over an uppermost end of the at least one upwardly-extending portion of the second U-channel to transfer downward pressure exerted on the horizontally-extending top portion of the second diffuser into the at least one upwardly-extending portion of the second U-channel and around the second flexible LED strip to protect the second flexible LED strip from the downward pressure.

\* \* \* \* \*